United States Patent [19]

Davidson

[11] 4,215,366

[45] Jul. 29, 1980

[54] SUBSCRIBER-LIMITED RECEPTION TELEVISION BROADCAST SECURITY ENCODER-DECODER SYSTEM

[75] Inventor: Richard A. Davidson, Deerfield, Ill.

[73] Assignee: Feature Film Services, Skokie, Ill.

[21] Appl. No.: 33,020

[22] Filed: Apr. 24, 1979

Related U.S. Application Data

[63] Continuation of Ser. No. 843,740, Oct. 19, 1977, abandoned.

[51] Int. Cl.$^2$ .................... H04N 7/16; H04K 1/04
[52] U.S. Cl. ................................ 358/124; 358/116; 358/121; 358/123
[58] Field of Search .................... 358/116, 121–124

[56] References Cited

U.S. PATENT DOCUMENTS

| | | | |
|---|---|---|---|
| 3,885,089 | 5/1975 | Callais et al. | 325/34 |
| 4,130,833 | 12/1978 | Chomet | 358/122 |

Primary Examiner—S. C. Buczinski
Attorney, Agent, or Firm—Robert L. Lindgren; Lloyd L. Zickert; Joseph A. Yanny

[57] ABSTRACT

A method and apparatus for encoding and decoding of standard television signals are provided for enabling reception thereof in an intelligible manner only by authorized subscribers. The scrambling of the video signals is effected by inversion of the video signals of some horizontal scan lines on a pseudo-random basis to produce a picture having some video signals inverted and others not inverted which is unpleasant to view and virtually unintelligible. The scrambling of the audio signals is effected by conversion of analog audio signals to coded digital audio signals. A plurality of unique pulse coded control signals consisting of 32-bit binary pulse trains are transmitted separately to identify individual authorized subscribers and to provide information needed to unscramble the scrambled video and audio signals. When there is a comparison between one of the pulse-coded control signals and a unique address code stored at a particular subscriber's receiver, unscrambling of the video and audio signals occurs in the same sequence as used for scrambling so as to provide restored video and audio signals without degradation in picture and sound qualities.

64 Claims, 21 Drawing Figures

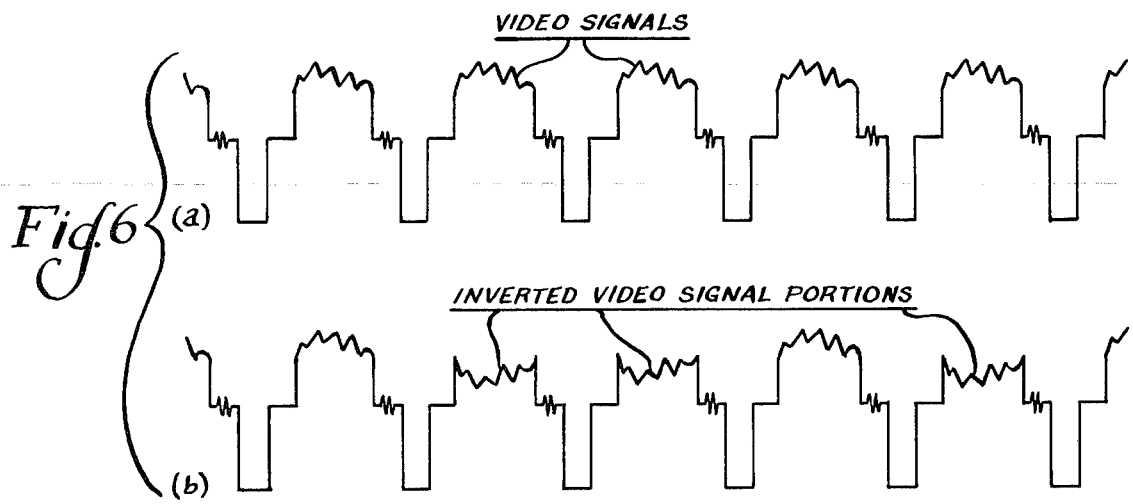
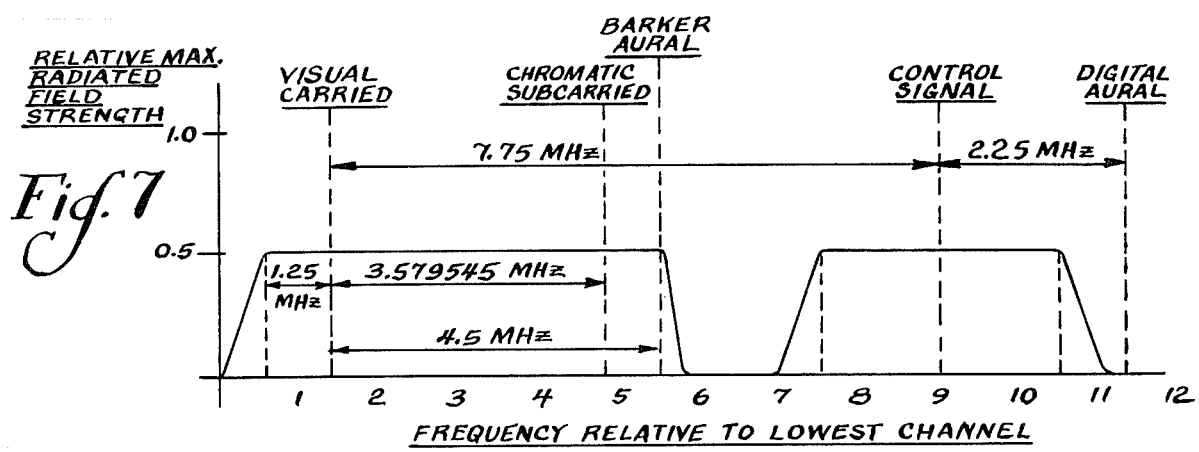
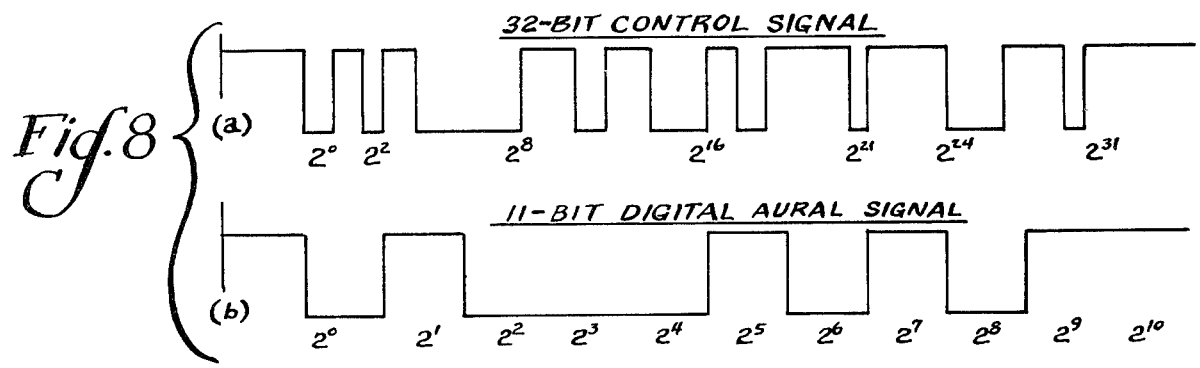

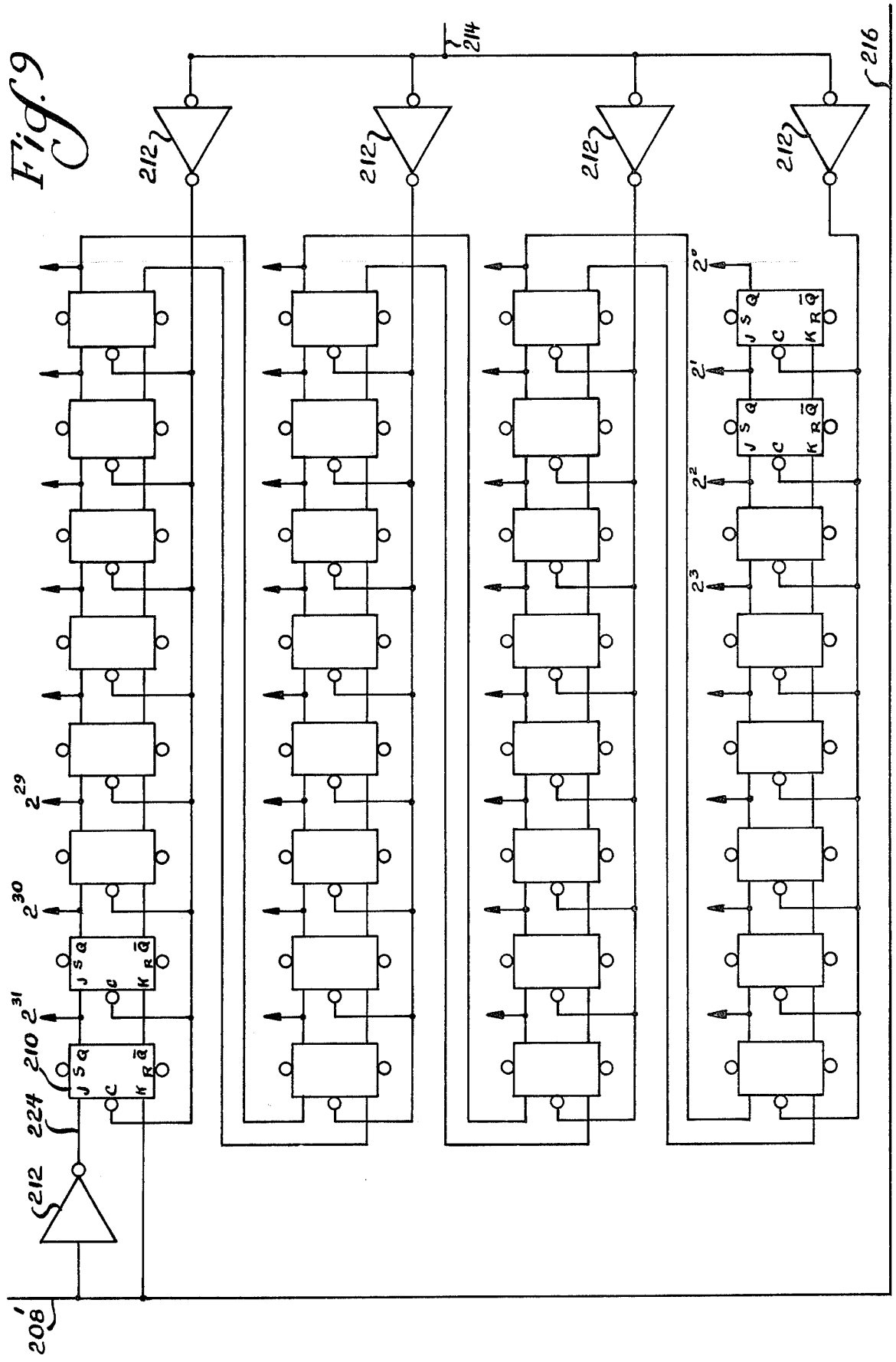

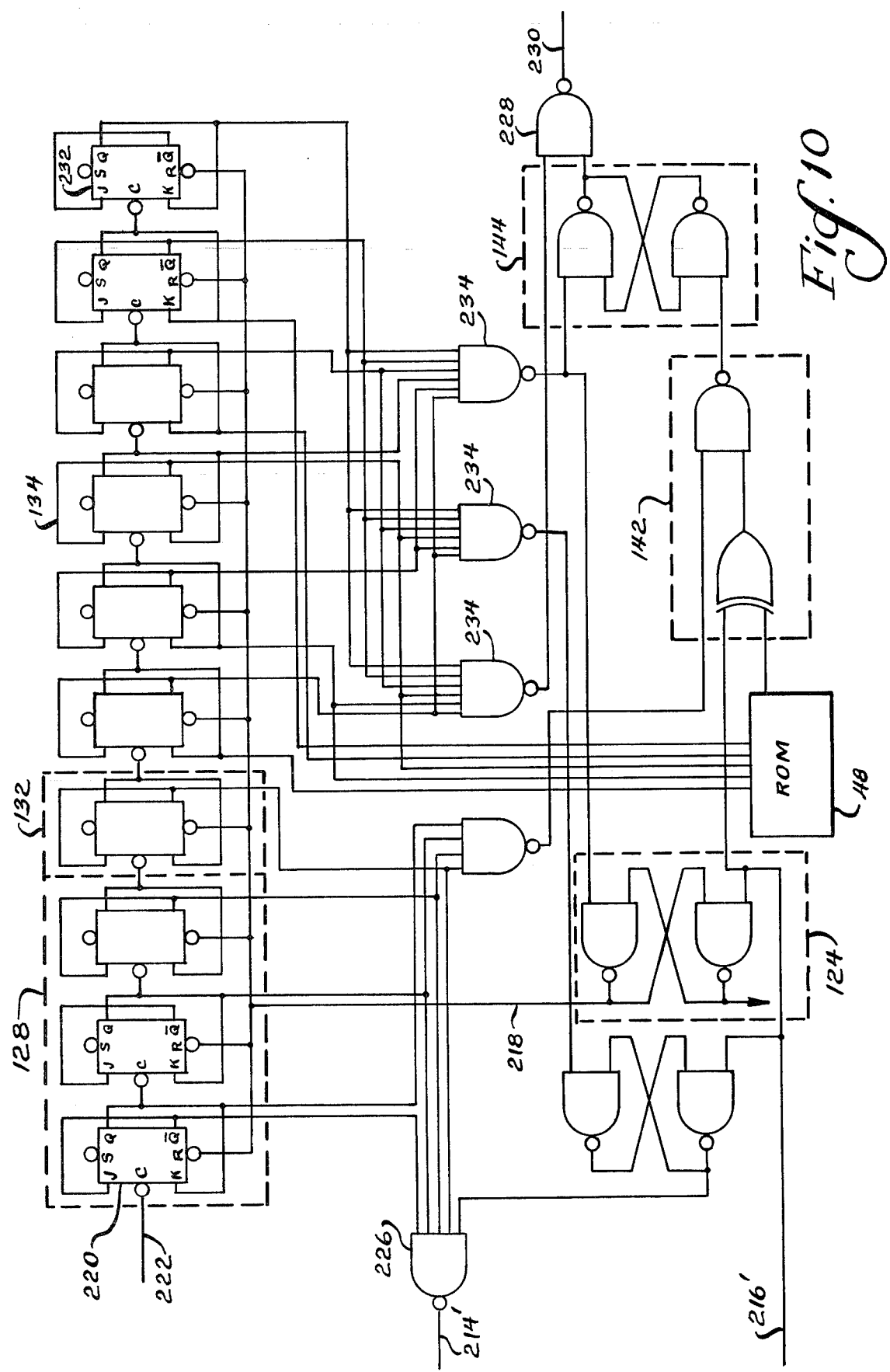

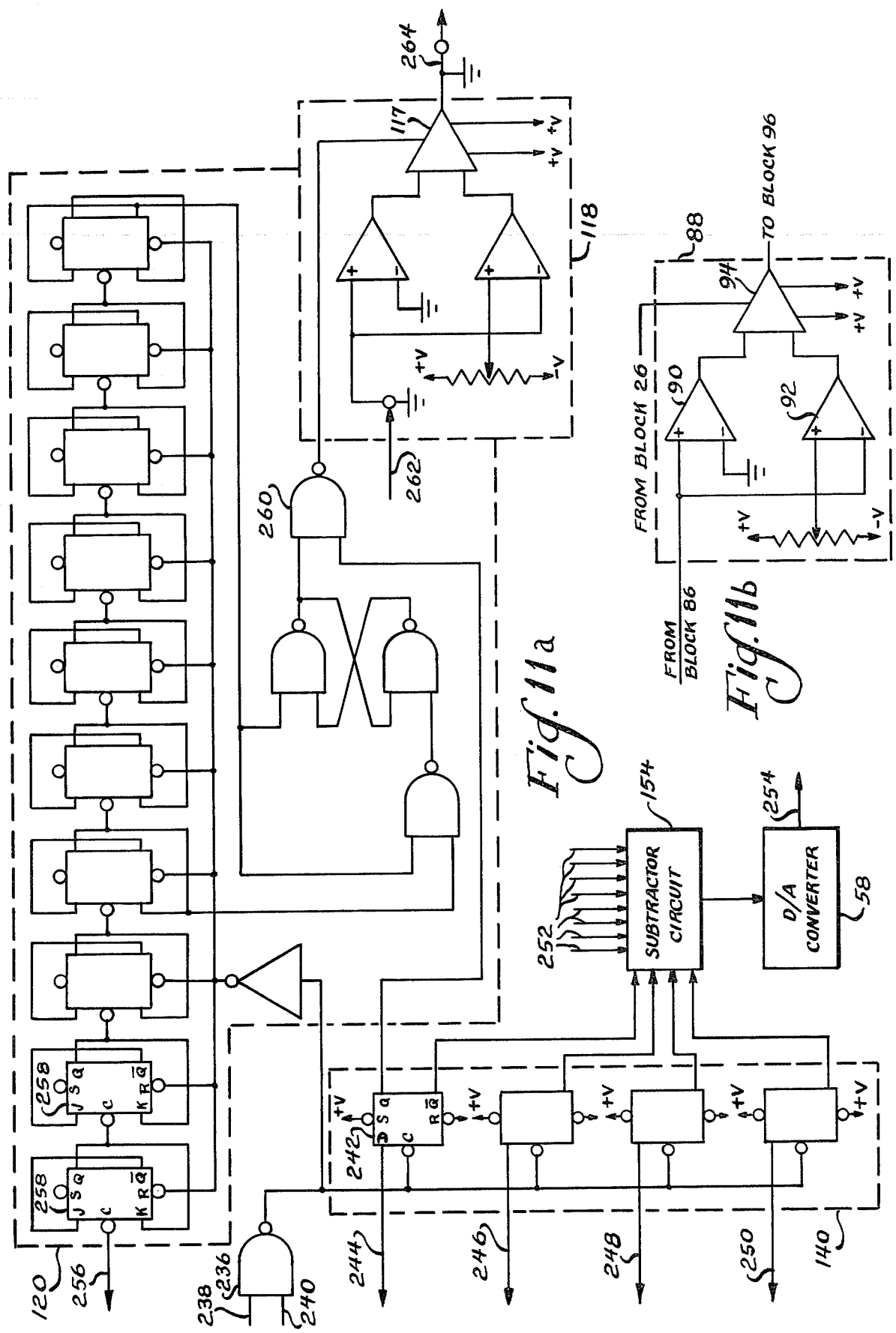

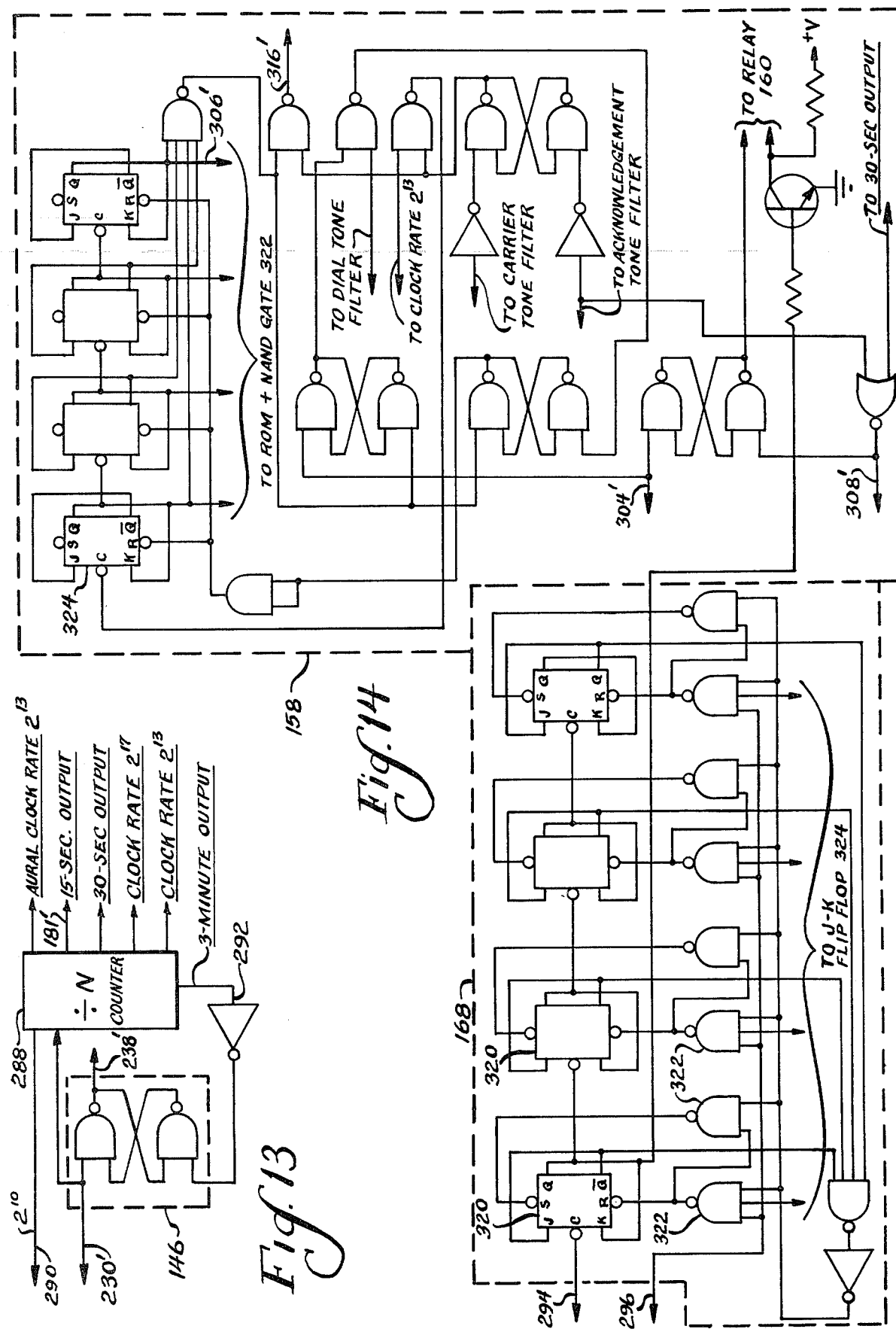

SUBSCRIBER-LIMITED RECEPTION TELEVISION BROADCAST SECURITY ENCODER-DECODER SYSTEM

This application is a continuation of application Ser. No. 843,740 filed Oct. 19, 1977, abandoned.

BACKGROUND OF THE INVENTION

This invention relates generally to security or subscription television systems and more particularly, it relates to a method and system for encoding and decoding of standard television signals thereby enabling reception thereof in an intelligible manner only by authorized subscribers.

Generally, there are known in the prior art various types of secure subscription television systems in which television signals are transmitted in a coded form for use only in subscribers' receivers having proper decoding means. In these systems, the coding is accomplished by modifying the sound and/or video portions of the television signals rendering them unintelligible or unpleasant to nonsubscribers or to subscribers who had not paid a fee to the broadcaster.

In these proposed secure subscription television systems, upon decoding the modified television signals, it was generally required that the precise modification signals must be removed or any missing signals must be generated and added to the modified television signals to produce a restored video as similar as possible to its original quality. Problems existed in these techniques due to the fact that the quality of the picture was generally subject to degradation and/or that difficulties were encountered in maintaining critical phase and other signal relationships in restoration.

The effectiveness of the secure subscription television systems is measured by the degree of success which it has in deterring unauthorized viewers from watching the modified television signals transmitted and in preventing the duplication of the decoding means.

It has also been experienced that in general the decoding technique utilized in the prior art systems could be easily duplicated by many resourceful viewers and thus defeat the security thereof. It would, therefore, be desirable to provide a method and system for encoding and decoding television signals in which maximum security is achieved and which will effectively deter unauthorized viewers in attempting to defeat the security. Moreover, it is needed to provide a system such that the theft thereof will be of little use or value.

In addition, the prior secure subscription television systems have a disadvantage in that none of them possess a positive and continuous control means for controlling automatically the decoder at the various subscriber stations whereby any or all of the decoders become selectively disabled or "locked out" if it does not receive the appropriate control signals from the broadcaster periodically before a pre-determined interval of time has elapsed. Thus, it would be desirable to provide a method and system for encoding and decoding of standard television signals in which the decoder at the subscriber's station are dependent continuously upon control signals transmitted by the broadcaster. In the absence of the periodic control signals, the decoder will automatically and rapidly become disabled rendering it essentially useless without the necessity of physically traveling to the subscriber's location.

It would also be suitable to provide in connection with a subscription television system means by which the subscribers could select the programs desired in a short time in advance of telecasting in a simple and easy manner. To this end, telephone communication circuitry can be provided so that the subscribers can request their programs to the broadcaster via a telephone interface which will transmit the subscriber's request to the broadcaster automatically without any great effort on his part other than by simply depressing a button at the subscriber's site. The telephone interface would automatically dial the broadcaster's telephone number, transmit the subscriber's unique account code to a computer at the broadcaster's site, and thus make possible the program selection by the subscriber at any time prior to the broadcast. Further, this would allow the system to be very reliable and substantially maintenance-free after the initial installation since all the control signals are done via over-the-air transmission and requests for service are done electrically on the telephone interface. There is eliminated the need to physically travel to the subscriber's location during normal use so as to supply or retrieve coins, cards, or tapes and the like for billing purposes as encountered in some prior art systems.

SUMMARY OF THE INVENTION

Accordingly, it is an over-all objective of the present invention to provide a new and novel method and apparatus for encoding and decoding standard television signals which possess very high security and deter unauthorized viewers.

Another object of this invention is to provide an improved method and apparatus for encoding and decoding standard television signals which restores the scrambled video and audio signals without degradation in picture and sound qualities.

Another object of this invention is to provide a method and apparatus for encoding and decoding standard television signals wherein the scrambling is basically accomplished by inversion of the video signals of some horizontal scan lines on a pseudo-random basis to produce a picture having some video signals inverted and others not inverted which is unpleasant to view and virtually unintelligible.

Still another object of this invention is to provide a method and apparatus for encoding and decoding standard television signals wherein a plurality of unique pulse-coded control signals consisting of 32-bit binary pulse trains are transmitted separately to identify individual authorized subscribers and to provide the information needed for unscrambling of the video and audio signals in the same sequence as used for scrambling.

Still another object of this invention is to provide a method and apparatus for encoding and decoding standard television signals wherein the audio scrambling is accomplished by conversion of analog audio signals to coded digital audio signals.

Still another object of this invention is to provide a method and apparatus for encoding and decoding standard television signals wherein control means continuous-ly enable decoding means at the various subscriber stations whereby any or all of the decoder means become selectively disabled or "locked out" if it does not receive the appropriate control signals from the broadcaster periodically before a pre-determined interval of time has elapsed.

Yet still another object of this invention is to provide a method and apparatus for encoding and decoding standard television signals wherein telephone communication circuitry allows the subscribers to request their programs to the broadcaster via a telephone interface.

Yet still another object of this invention is to provide a method and apparatus for encoding and decoding standard televisions signals having means for transmitting aural barker signals simultaneously with scrambled video signals and means for receiving the barker signals regardless of whether the subscriber is authorized to receive the unscrambled video signals so as to promote usage of the subscription television system.

In accordance with these aims and objectives, the present invention is concerned with the provision of an improved method and apparatus for encoding and decoding standard television signals for over-the-air or cable subscription television and the like, but avoids the difficulties experienced in the prior art systems such a necessity of critical phase relationship between signals, degradation in the picture quality, and easy duplication of the decoder means thereby defeating the security.

Briefly, the present invention provides a method and system for encoding and decoding of standard television signals thereby enabling reception thereof in an intelligible manner only by authorized subscribers. The video scrambling is effected by inversion of the video signals of some horizontal scan lines on a pseudo-random basis to produce a picture having some video signals inverted and others not inverted which is unpleasant to view and virtually unintelligible. The audio scrambling is accomplished by conversion of analog audio signals to coded digital audio signals. A plurality of unique pulse-coded control signals consisting of 32-bit binary pulse trains are transmitted separately to identify individual authorized subscribers and to provide the information needed to unscramble the scrambled audio and video signals. When there is a comparison between one of the pulse-coded control signals with a unique address code associated with a particular subscriber, unscrambling of the video and audio signals occurs in the same sequence as used for scrambling to provide restored video and audio signals without degradation in picture and sound qualities. This scrambling technique is done without affecting or altering the normal specification for composite video, color and aural transmission or for the broadcaster's transmitter utilized in the normal telecasting.

It will be appreciated from the foregoing that the present invention provides a new and novel method and apparatus for encoding and decoding standard television signals in subscription television systems. In particular, since the invention utilizes control signals consisting of 32-bit binary pulse trains to identify the various authorized subscribers each having a different code combination, it provides a very high security system thereby preventing unauthorized viewers from unscrambling of the video signals. Moreover, the audio signals are also scrambled to increase the security of the system and to deter most unauthorized viewers by converting the analog audio signals to coded digital audio signals. Additionally, the present invention includes control means for continuously enabling decoder means at the various subscriber stations whereby any or all of these decoder means become selectively disabled or "locked out" if it does not receive appropriate control signals from the broadcaster periodically before a predetermined interval of time has elapsed.

BRIEF DESCRIPTION OF THE DRAWINGS

These and other objects, features and advantages of the invention, as well as the invention itself, will become more apparent to those skilled in the art from the following detailed description when read in conjunction with the accompanied drawings in which like reference numerals indicate like or corresponding parts throughout the several views wherein:

FIG. 6(a) is a time-amplitude graph of a conventional, normal scanning line in a television signal;

FIG. 6(b) is a graph similar to that shown in FIG. 6(a), in which some video signal portions have been randomly inverted, according to the present invention;

FIG. 7 is a spectral distribution of the signals transmitted in the present invention;

FIG. 8(a) is an example of a control signal consisting of 32 bits, according to the present invention;

FIG. 8(b) is an example of a digitized aural signal consisting of 11 bits, employed in the present invention;

FIG. 9 is a schematic diagram showing circuitry suitable for use as the shift register 122 of FIG. 3;

FIG. 10 is a more detailed schematic block diagram showing circuitry suitable for use in certain of the blocks of FIG. 3;

FIG. 11(a) is a schematic diagram illustrating circuitry which may be employed in certain of the other blocks of FIG. 3;

FIG. 11(b) is a schematic diagram illustrating in more detail the circuitry which may be used as the video switching amplifier 88;

FIG. 13 is a block diagram depicting the circuitry suitable for use as the blocks 146, 150 shown in FIG. 3;

FIG. 14 is a schematic diagram illustrating circuitry which may be employed in certain of the blocks of FIG. 4;

DETAILED DESCRIPTION OF THE PREFERRED EMBODIMENT

Figure 1:
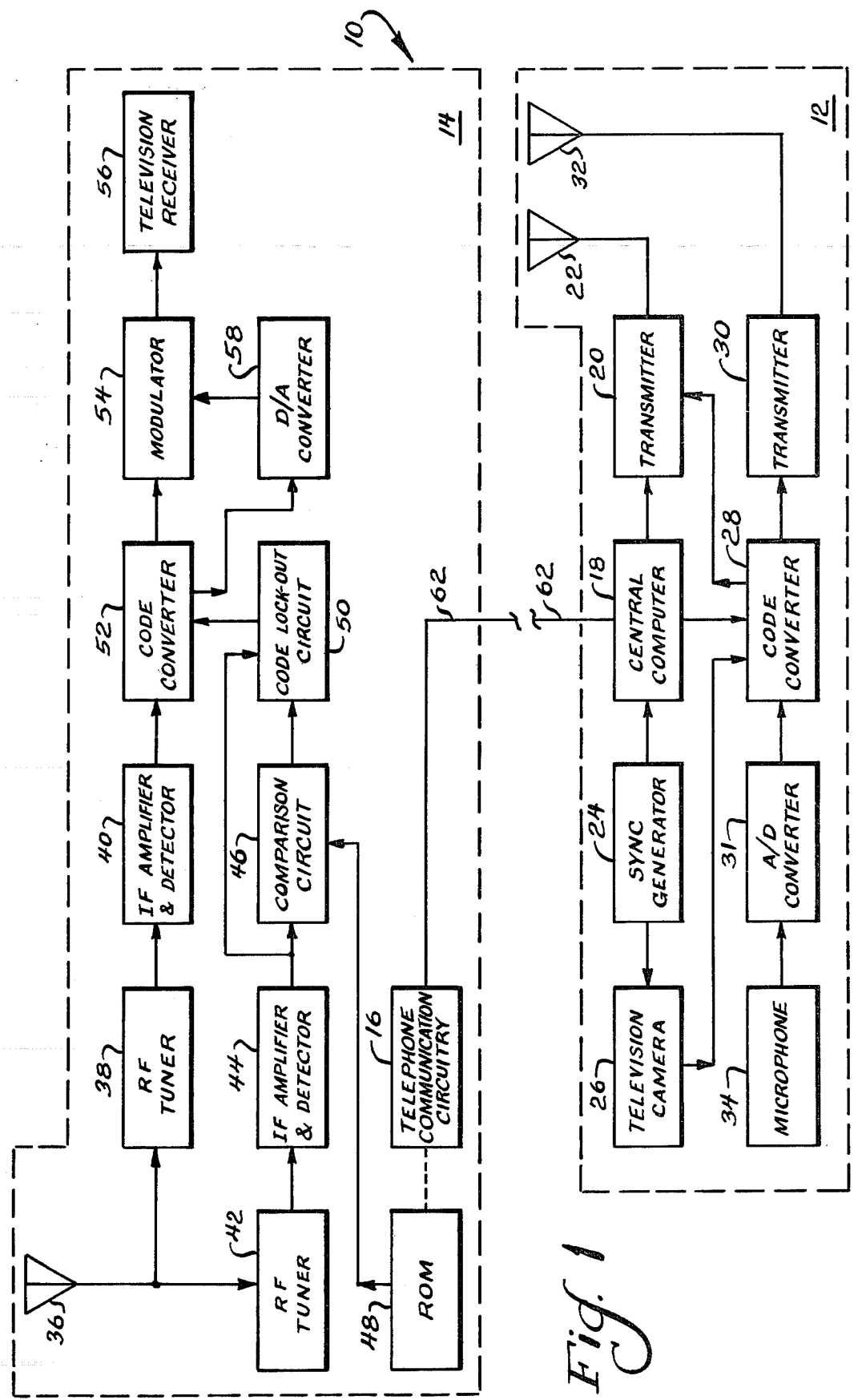
FIG. 1 is a simplified, over-all block diagram of a subscription television system in accordance with the present invention.

Referring now in detail to the drawings, FIG. 1 illustrates a simplified, over-all block diagram of a subscription television system according to the present invention. It should be understood that this system can be utilized in various forms of television transmission and reception, including over-the-air or cable television. Like reference numerals have been employed throughout the various drawings to designate like parts.

In FIG. 1, the subscription television system designated generally by reference numeral 10 consisting of a transmitter section 12, a receiver section 14, and telephone communication circuitry 16 located at the receiver section 14 for communication with the transmitter section 12. A central computer 18 is used to store information signals identifying the various authorized subscribers and sends out these information signals to a transmitter 20 for transmission over-the-air via antenna 22. A synchronizing (sync) generator 24 is connected to the computer 18 for synchronizing the information signals sent from the computer to the horizontal scanning rate used by a television program source such as television camera 26. In order to prevent unauthorized viewers from receiving the telecast, the signals from the television camera 26 are processed by a code converter 28 along with the same information signals from the computer utilized to identify the authorized subscribers, which modifies the signals in such a way to be unintelligible to unauthorized subscribers. These signals are then sent over-the-air via a transmitter 30 and antenna 32. Analog audio signals from a sound source such as microphone 34 can also be processed or modified in the converter 28 by sending the audio signals through an analog-to-digital converter 31 to produce digitized audio signals. The scrambled audio signals from the code converter 28 are also transmitted via the transmitter 20 and antenna 22.

The scrambled television signals, the scrambled audio signals and the information signals are received by antenna 36. These signals are then delivered to an RF tuner 38 coupled to an intermediate frequency (IF) amplifier and detector 40 which detects the scrambled television signals and to an RF tuner 42 coupled to an IF amplifier and detector 44 which detects the scrambled audio signals and the information signals. The scrambled television signals are sent to a code converted 52 for re-processing. The information signals from the detector 44 are sent to a comparison circuit 46 to determine if one of the information signals matches the unique address associated with a particular subscriber stored in read-only-memory 48. These same information signals serve as control signals and are delivered to a code lockout circuit 50 as is the output of the comparison circuit 46. When there is a match, the comparison circuit 46 activates the circuit 50 to allow the control signals to pass through to the code converter 52 which unscrambles the television signals from the detector 40 and the scrambled audio signals from the detector 44. The unscrambled television signals are sent to a modulator 54 for converting the television signals to a frequency corresponding an unused numbered channel on a conventional television receiver 56. The digitized audio signals from the code converter 52 are also sent to the modulator 54 for transmission on the receiver 56 via a digital-to-analog converter 58 for converting the digitized audio signals to the original analog audio signals.

Each subscriber can select the programs he wishes to view by simply depressing switches or buttons (not shown) associated with the telephone communication circuitry 16 located at the receiver section 14. The selections are transmitted to the computer 18 directly by telephone lines 62. It should be apparent to those skilled in the art that the present subscription television system can be easily converted to conventional cable television systems by simply replacing the antennas 22, 32 and 36 with an appropriate, interconnected coaxial cable (not shown).

The transmitter section 12 shown in FIG. 1 will now be described in greater detail with reference to FIG. 2. The central computer 18 is utilized to generate randomly a sequence of codes, each one representing a particular account number or address of an individual subscriber. Each of the codes is a pulse train of 32 bits, each of the bits being either high ("1" state) or low ("0" state), except that the first bit is always made to be low and the last bit is always made to be high so as to facilitate the detection and synchronization by the circuitry in the receiver section 14. Thus, the number of different subscriber codes available is $2^{30}$ or 1,073,741,824 since this is the number of possible combinations of thirty bits each of which can be either high or low.

These codes are selected by the computer 18 such that each of the eligible subscriber's code is transmitted in a pre-determined sequence and is then repeated on a continuous cycle thereafter. Each of the 32-bit codes are addresses of the individual subscribers located in the broadcaster's coverage area. When these transmitted codes are reprocessed at the receiver station 14, it produces the required information that it utilized to determine the code used to encode or scramble both the aural and visual portions of the broadcasted television program.

The broadcast of these 32-bit codes or encoded signals is synchronized to the horizontal scanning rate produced by the sync generator 24 as is conventionally used by the television camera 26 in the standard television studio. The sync generator 24 provides a pulse pattern at the rate of 15,750 times per second (15,734 for color) which corresponds to 525 horizontal scan lines in the visual raster of a conventional television picture traced by an electron beam of varying intensity from the top to the bottom of the picture in 1/30 of a second. The horizontal sync pulse or signal output of the generator 24 is connected via lead line 60 to the inputs of the television camera 26 and a monostable circuit (one-shot) 64. The monostable circuit allows adjustment in the pulse width of the horizontal sync signal, and its output controls a master clock 66 having pre-set frequency of 16.128 MHz (16.111 MHz for color) and provides data request signals to the computer 18. The output pulses from the master clock 66 are phase-locked to the horizontal scanning rate. The vertical sync pulse or signal output of the generator 24 is connected via lead line 68 to an input of the television camera 26 and to monostable circuit 70 in which the width of the vertical sync pulses are adjusted and are used to provide interrupt request signals to the computer 18.

The computer sends out randomly the various 32-bit binary subscriber codes on line 72 in a parallel manner to a parallel-to-serial converter 74. Since a different 32-bit code is sent out by the computer 18 at the rate of the horizontal scanning frequency of 15,750 times per second as provided by the sync generator 24, this means that 945,000 individual subscribers can be selectively controlled to unscramble the transmitted signals every minute. The converter 74 transforms the codes from parallel into a serial sequence for modulation of the transmitter 20 via a frequency shift keying (FSK) FM modulator 76. These same 32-bit codes of the various subscribers are also made available on line 78 and are processed into corresponding 4-bit codes or words by an adder network 80. These 4-bit words contain the information to be utilized in determining the encoding or scrambling pattern of the video and sound portions of the broadcasted signals. The details of the adder network 80 will be discussed more fully hereinafter.

The coded signals from the output of the adder network 80 are coupled to data input of a D-type gating flip-flop for synchronization with the horizontal scanning rate which is connected to the clock input of the D-type flip-flop via lead line 84. The output of the flip-flop 82 contains the encoded pattern which scrambles the visual and aural portion of the televised signal via an active line gate 86 and a gated video switching amplifier 88 and an additional adder network 100, respectively. The switching amplifier 88 consists actually of three separate amplifiers, one being a non-inverting amplifier 90, a second being an inverting amplifier 92 and a third amplifier 94 determining whether the output of the non-inverting amplifier 90 or the inverting amplifier 92 is fed to its input. (See FIG. 11(b)). Since the active line gate 86 drives the switching amplifier 88, the output of the switching amplifier will be dependent upon the binary state of the active line gate 86, which is either in the "1" (high) or "0" (low) states. The line gate 86 is actuated only during the portion of the televised signal that contains the actual visual or picture portion and is de-activated during the synchronization intervals. When the output of the line gate 86 is in the high state, the video portion of the televised signal is sent through the non-inverting amplifier 90 and the output of the switching amplifier 88 is not inverted. However, when the output of the line gate 86 is in the low state the video portion of the televised signal is inverted. Since the output of the adder network 80 passed through the active line gate 86 switches between the two binary states on a pseudo-random basis, this causes some of the video signal portions at the output of the switching amplifier 88 to be positive and some to be negative, which creates a mosaic quality in the picture. This scrambled picture is very unpleasant and completely unintelligible to the unauthorized viewers. The output of the switching amplifier 88 having the scrambled picture is coupled to an AM modulator 96 for amplification and modulation. The output of the modulator 96 is then sent to the transmitter 30 for broadcasting the scrambled picture via the antenna 32.

As is well-known, the original visual information and the chrominance information originate in the television camera 26 and a chromatic (color) sub-carrier generator or phase modulator 98 respectively. As previously mentioned, the horizontal and vertical synchronation signals sent to the central computer 18 are also used to synchronize the horizontal and vertical scanning rate of the television camera 26. A typical audio source originating the microphone 34 at the broadcaster's site or a similar audio source such as a tape recorder, film chain, phonograph record and the like is also encoded or scrambled so as to increase the security of the system by first converting the original aural signals (analog form) to digital pulse trains each consisting of 11 bits via the analog-to-digital converter 31. Each of the bits are either high ("1" state) or low ("0" state), but the first bits are always made to be low and the last bits are always made to be high so as to facilitate the detection and synchronization by the circuitry in the receiver section 14. Then, these pulse trains of the digitized aural signals are added binarily with the 4-bit binary outputs of the D-type flip-flop 82 resulting from the adder network 80 via the additional adder network 100. These resultant 11-bit binaries are converted to serial pulse trains by a shift register or parallel-to-serial converter 102. These serial pulse trains are coupled to a frequency shift keying FM modulator 104 for amplification and modulation before being sent to the transmitter 20 and transmitting antenna 22 for broadcast.

In addition, a second audio source 106 can be processed in an unscrambled form by an FM modulator 108 for transmission via the transmitter 30 and the transmitting antenna 32. The second audio source 106 is referred to as a "barker" source and can be heard by all of the television receivers. It is utilized for encouraging the viewers to use the programming of the subscription television system and is available for announcement and to promote marketing of the subscription television programs to potential purchasers or other suitable use.

A control terminal 110 is connected to the computer 18 for controlling manually the enabling and disabling of various subscribers. A modem 112 is coupled also to the computer 18 for transferring the program requests from the various subscribers sent on the telephone line 62 as will be explained in detail in connection with the telephone communication circuitry 16.

The receiver section 14 shown in FIG. 1 of the drawings will now be discussed more fully with reference to FIG. 3. Each subscriber to the subscription television system is provided with a housing or box-type enclosure (not shown) containing all of the receiver circuitry in the receiver section 14 including the telephone communication circuitry 16 for operative connection to his conventional television receiver 56. The enclosure is typically placed adjacent or on top of the subscriber's television receiver. The enclosure is interconnected between the subscriber's receiving antenna terminal connections and the television receiver 56. Power is supplied to the enclosure via a 120 VAC power input terminal located on the enclosure. This enclosure is further connected to a telephone terminal outlet (not shown) conventionally supplied by a local telephone utility company for communication with the broadcaster to request service of the program desired via the telephone communication circuitry 16, as will be discussed more fully later.

All of the transmitted signals from the transmitting antennas 22 and 32 and all of the other conventional, unscrambled television channel signals are received as incoming signals on the receiving antenna 36. It should be recalled that the transmitting antenna 22 is sending out two separate sets of digitally excited frequency shift keying data signals, namely, the digital control signals each having a pulse train of 32-bits and the digital audio signals each having a pulse train of 11-bits. The other transmitting antenna 32 is sending out the encoded or scrambled video signals, the normal chrominance signals, and the "barker" audio signals.

The incoming signals are now processed by splitting them into three paths at an RF splitter 114. One path drives the RF tuner 38 coupled to the IF amplifier and detector 40 which extracts all of the scrambled video, normal chrominance, and "barker" audio signals. A second path is processed by the RF tuner 42 coupled to the IF amplifier and detector 44 for removing all of the digital audio signals and digital control signals. A third path via lead line 116 is utilized to receive the other unscrambled channel signals when the subscription television system is not in use.

It will be apparent that in systems dealing with scrambling and unscrambling of signals the methods used in unscrambling are functionally complementary to the ones used in the scrambling process, and that the unscrambling and scrambling processes have to be completely synchronized. Thus, many of the circuit components that will be discussed hereinafter in the receiver section 14 are similar in operation to those previously mentioned in the transmitting section 12.

The scrambled video signals from the output of the detector 40 is connected to a gated video switching amplifier 118 similar to the switching amplifier 88 for unscrambling and restoration of the picture back to a normal image. However, this can occur only if proper decoding signals controlling an active line gate 120 similar to the line gate 86 will cause inverting or non-inverting of the video portions of the televised signals on a line for line basis in exact correspondence to the scrambling by the active line gate 86. The reprocessing of the control signals to generate the decoding signals will now be explained in detail.

An output containing the control signals from the detector 44 is sent to a serial-to-parallel converter or shift register 122 and to a pulse detector 124. Since the first bits of the incoming pulse train control signals are always beginning with a low level, the pulse detector 124 is utilized to sense the shift from a high level to a low level. When the shift is detected, the output of the detector 124 drives a monostable circuit 126 (one-shot) to synchronize the receiver circuitry with the transmitter horizontal scanning rate of 1,570 Hz and also to permit adjustment of the pulse width from the detector.

Once the shift is detected, the monostable circuit 126 initiates the counting of a divide-by-eight counter 128 ($\div 8$). The clock rate of the counter 128 is provided by a master clock 130 similar to the clock 66 having a pre-set frequency of 16.128 MHz which is actually 16 times greater than the pulse rate of the incoming control signals and is phase-locked to the horizontal scanning rate of the transmitter section 12. Thus, after eight clock pulses are counted, the middle of the first bit or pulse of a 32-bit incoming control pulse train will be at the input of the shift register 122. At this point, a transfer pulse will be generated to shift the first bit into the shift register 122 for storage.

The output of the counter 128 is coupled to a divide-by-16 counter 132 ($\div 16$), which is in turn connected to a divide-by-32 counter 134 ($\div 32$). Subsequent to the storage of the first bit, the counter 128 is stopped and the counter 132 is activated to count so that 16 pulses later, the shift register 122 will have at its input the middle portion of the second bit of the 32-bit pulse train. Once again, a transfer pulse will be generated to shift now the second bit into the shift register 122 for storage. The first bit previously stored will be shifted serially down the shift register. This process is repeated thirty more times and as a result will cause all 32-bits to be stored in the shift register 122. When the thirty-secondth pulse is stored, all of the counters 128, 132 and 134 are reset and made ready for the next control signal. Thus, the serial control pulse trains each of a full 32-bits will become stored in the shift register and is made available as parallel sets of 32 data bits (see FIG. 9).

Figures 5, 12:
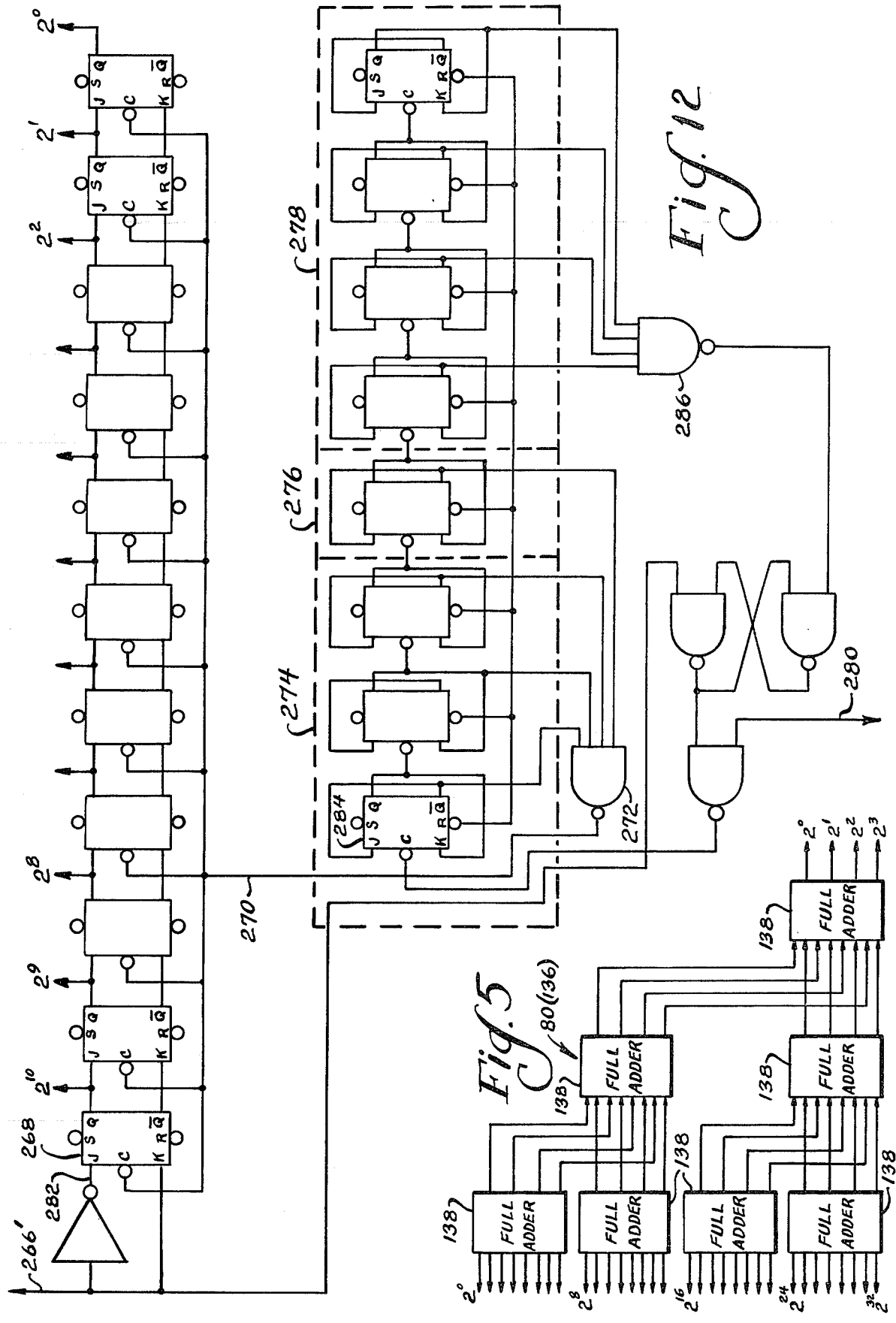
FIG. 5 is a simplified block diagram depicting circuitry suitable for use as the adder networks 80, 136 of FIGS. 2 and 3.
FIG. 12 is a schematic diagram showing circuitry suitable for use as the shift register 152 of FIG. 3.

The 32-bits of the shift register 122 are taken out to an adder network 136 which converts the 32-bits down to a 4-bit unscrambling code. The adder network 136 is identical in operation to the adder network 80 in the transmitter section 12 and produces the 4-bit unscrambling code identical to the 4-bit scrambling code used to scramble the video and aural portion of the originally transmitted signals. A simplified block diagram of the adder networks 80 and 136 are illustrated in FIG. 5 and is comprised of seven full binary adder circuits 138 interconnected as shown. However, it should be understood that the 32-bit input lines can be interchanged by their bit locatons on a pre-determined basis to provide increased security in the system. Thus, this produces the 4-bit codes at the output of the adder network 136 in a pseudo-random scrambling pattern.

A D-type clocking flip-flop 140 is connected to the output of the adder network 136 for holding the 4-bit pattern for the duration of the next horizontal scanning line in order to decode that scanning line and all of the audio signals received during that same interval. The flip-flop 140 drives the active line gate 120 for controlling the switching amplifier 118 to switch its inputs between the inverted and non-inverted inputs in the same sequence as the encoding operation by the switching amplifier 88. In this manner, the horizontal scanning lines at the transmitter section 12 are reproduced at the receiver section 14 so that the received video signals will become restored to the original unscrambled picture.

However, this restoration process is permitted to occur only if one of the plurality of 32-bit control signals generated on a pseudo-random basis by the central computer 18 and transmitted via the antenna 22 is matched perfectly (bit for bit) with a unique 32-bit code assigned to a particular subscriber's television receiver 56 which is stored in the read-only-memory (ROM) 48. The transmitted incoming control signals at the output of the dectector 44 are compared by a comparator 142 with the unique contents of the ROM 48. The content of the ROM 48 is synchronized with the incoming control signals by the counter 134.

If the comparison is unsuccessful, the 4-bit code in the D-type flip-flop 140 is prevented to be clocked to the active line gate 120 controlling the switching amplifier 118 to unscramble the video signals. On the other hand, if there is a successful match between one of the control signals and the ROM 48 of the particular subscriber, then a flip-flop 144 is set and gates a decode-enable flip-flop 146 which permits the output signals of the monostable circuit 126 to be sent as clock pulses and set at the horizontal scanning rate to the D-type flip-flop 140. Unless the clock pulses of the monostable circuit 126 via lead line 148 are passed through the decode-enable flip-flop 146, the D-type flip-flop 140 will not be activated.

Upon a comparison, the output of the flip-flop 144 also resets a three-minute timeout timer 150 to zero. When the timer 150 reaches the three-minute mark, it will cause the decode-enable flip-flop 146 to be reset thereby stopping the decoding process as the clock pulses to the D-type flip-flop 140 will be blocked by the flip-flop 146. Thus, continuous decoding is possible and uninterrupted, restored video and aural signals are available to the subscriber only if the comparator 142 causes the flip-flop 144 to reset the three-minute timer 150 at least once every three minutes.

A second output containing the digitized aural signals from the detector 44 is sent to a serial-to-parallel converter or shift register 152 to convert the signals to parallel digital binary form. A subtractor circuit 154 combines the 4-bit unscrambling codes from the D-type flip-flop 140 with the encoded digitized aural signals. The subtractor circuit 154 operates similar to the adder networks 80 and 136, except that it is actually using 2's complement addition in order to realize unscrambled digitized aural signals corresponding to the ones at the output of the analog-to-digital converter 31 in the transmitter section 12. The output of the subtractor circuit is connected to the digital-to-analog converter 58 to produce analog signals identical in form to the original audio signals generated by the source 34 at the broadcaster's site. Thus, it can be seen that decoding of the aural signals is also dependent upon the D type flip-flop 140.

The restored video signals at the output of the switching amplifier 118 and the restored audio signals at the output of the digital-to-analog converter 58 are fed into the modulator 54 which converts these signals to a desired locally unused VHF channel (2-13) as the secured channel. Typically, channel 3 or 6 can be a suitable choice. These signals are combined with all of the other unscrambled television channels received by the antenna 36 via RF combiner circuit 155. This allows view of all the channels on the television receiver 56 including the secured channel, and selection of the particular channel is achieved merely by turning a channel selector dial (not shown) on the television receiver 56.

The telephone communication circuitry 16 shown in FIG. 1 of the drawings will now be described in greater detail with reference to FIG. 4. Each subscriber can select the particular televised program he desires to recieve by depressing one of a plurality of buttons or switches 156. It should be understood that any desired number of buttons or switches can be utilized and connected to perform various functions. For example, some buttons can be used to select the particular programs to be viewed at a desired time while others can be used to cancel or correct errors in the program request. Once a button associated with a particular program is depressed, this selection is transmitted on the telephone lines 62 to a local telephone company's central office (not shown). In a large metropolitan area, the central office would then communicate with another central office which, in turn, relays the program requests to the computer 18 at the broadcaster's site via the telephone lines 62 and the modem 112 (modulator-demodulator). This communication process will now be discussed more fully.

When a subscriber wishes to receive a particular program, he simply depresses the appropriate button 156 which activates a sequence control network 158 to energize a hook-switch relay 160 allowing an "off-hook" or "on-line" condition with the local central office. When a dial tone is placed on the telephone lines 62 by the central office, dial tone detector or filter 162 causes the sequence control network 158 to transmit dial address stored in binary form in a read-only-memory (ROM) 164. This ROM 164 is similar to the ROM 48 in the receiver section 14 and in fact, can be the same one. There are two methods of dial addressing which are available. First, a multi-frequency tone generator 166 can be used to transmit a designated telephone number employed by the broadcaster to receive automatic telephone requests. The tone generator 166 is known generally by the trademark "Touch-Tone". Alternatively, a programmable divide-by-n counter 168 can be provided to interrupt current flow in the relay 160 to dial the designated telephone number. This latter method is known as the dial pulse method of dial addressing wherein the number of contact closure interruptions are varied as with a corresponding number on a rotary dial. A row/column decode 170 converts the dial address from the ROM 164 either into row and column numbered pairs for the tone generator 166 or into 2's complements for loading into the programmable divide-by-n counter 168 for pulse method dialing via an interface buffer 172 and the hook-switch relay 160.

Once the dialing process is completed, the sequence control network 158 is arrested and awaits a carrier tone generated by the modem circuitry 112 at the broadcaster's site. When filter 174 detects the presence of the carrier tone, it causes the sequence control network 158 to address the ROM 164 storing the particular subscriber's code consisting of 32-bits and to send them out in a parallel sequence of four eight-bit words. A gating circuit 176 is coupled to the output of the ROM 164 and groups the four words for activating a voltage-to-frequency converter 178 to generate frequency shift keying modem tones which contain the subscriber's unique address or account code. Subsequent thereto, the subscriber's request code indicating which of the buttons 156 he has depressed is transmitted via the gating circuit 176 and the converter 178.

After the request code has been transmitted, the sequence control network 158 stops the gating circuit 176 and then awaits for an acknowledgment tone from the modem circuitry 112 at the transmitter section 12. When the acknowledgment tone is detected by acknowledgment tone filter 175, the sequence control network 158 is disconnected from the telephone lines 62 by the de-energization of the relay 160 and lights an acknowledgment light 180 for 15 seconds. While only one acknowledgment light is illustrated, it should be clear that any number could be provided to indicate which button corresponding to a particular request was depressed. However, if no dial tone, carrier tone, or acknowledgment tone is detected or if any part of the dialing sequence is tied up beyond a pre-determined time interval, a time-out timer 182 having its input clock pulses set at the horizontal scanning rate via lead line 184 interconnected with lead line 184' (FIG. 3) will reset the sequence control network 158 and activates a fault light 186 for 15 seconds.

An isolation transformer 188 is utilized to protect the telephone communication circuitry 16 and isolates it from telephone circuits in the local central office. A holding current coil 190 draws current from the telephone circuits when the hook-switch relay 160 is closed for causing the "off-hook" condition to be detected at the local telephone company's central office which will respond with a dial tone. It should also be apparent to those skilled in the art that the account code and request code of the various subscribers may be placed on storage devices (not shown) such as disk drives and magnetic tapes for use by the central computer 18 to generate the account codes of the various authorized subscribers thereby permitting the subscribers to view the transmitted scrambled video and/or audio signals.

FIG. 6(a) illustrates the time-amplitude relationship of a conventional, normal scanning line which includes the composite video and synchronization signals. In FIG. 6(b), there is shown an example of the transmitted scrambled video signal of the present invention wherein certain video portions of the horizontal scan line have been randomly inverted.

FIG. 7 shows a spectral distribution in terms of relative maximum radiated field strength of the signals transmitted in the present invention verses the frequency relative to the lowest channel. In particular, the graphical representation of FIG. 7 illustrates in the left-hand half the 6 MHz frequency allocation of a standard television channel as defined by the F. C. C. As is well known, the picture or visual carrier signal, the chromatic subcarrier frequency, and the center of the barker aural frequency are located at approximately 1.25 MHz, 4.83 MHz, and 5.75 MHz, respectively, above the lower frequency end of the television channel. The right-hand half of FIG. 7 depicts the control signal center frequency and the digital aural frequency which are located respectively at approximately 9 MHz and 11.25 MHz.

FIG. 8(a) shows an example of one of the plurality of unique pulse-coded control signals consisting of a 32-bit binary pulse train which are transmitted separately by the broadcaster to identify individual authorized subscribers and to provide the information needed for unscrambling of the video and audio signals in the same sequence as used for scrambling. FIG. 8(b) is an example of the scrambled or coded audio signals, i.e., digitized audio consisting of a 11-bit pulse train for increasing the security of the system.

While the various blocks shown in FIGS. 1 through 4 may take on various forms, suitable circuitry therefor are illustrated in FIGS. 9 through 18. Although these schematic diagrams are believed to be self-explanatory to those skilled in the art in view of the foregoing discussion, a brief description of the operation of each figure is believed to be in order.

Figure 2:
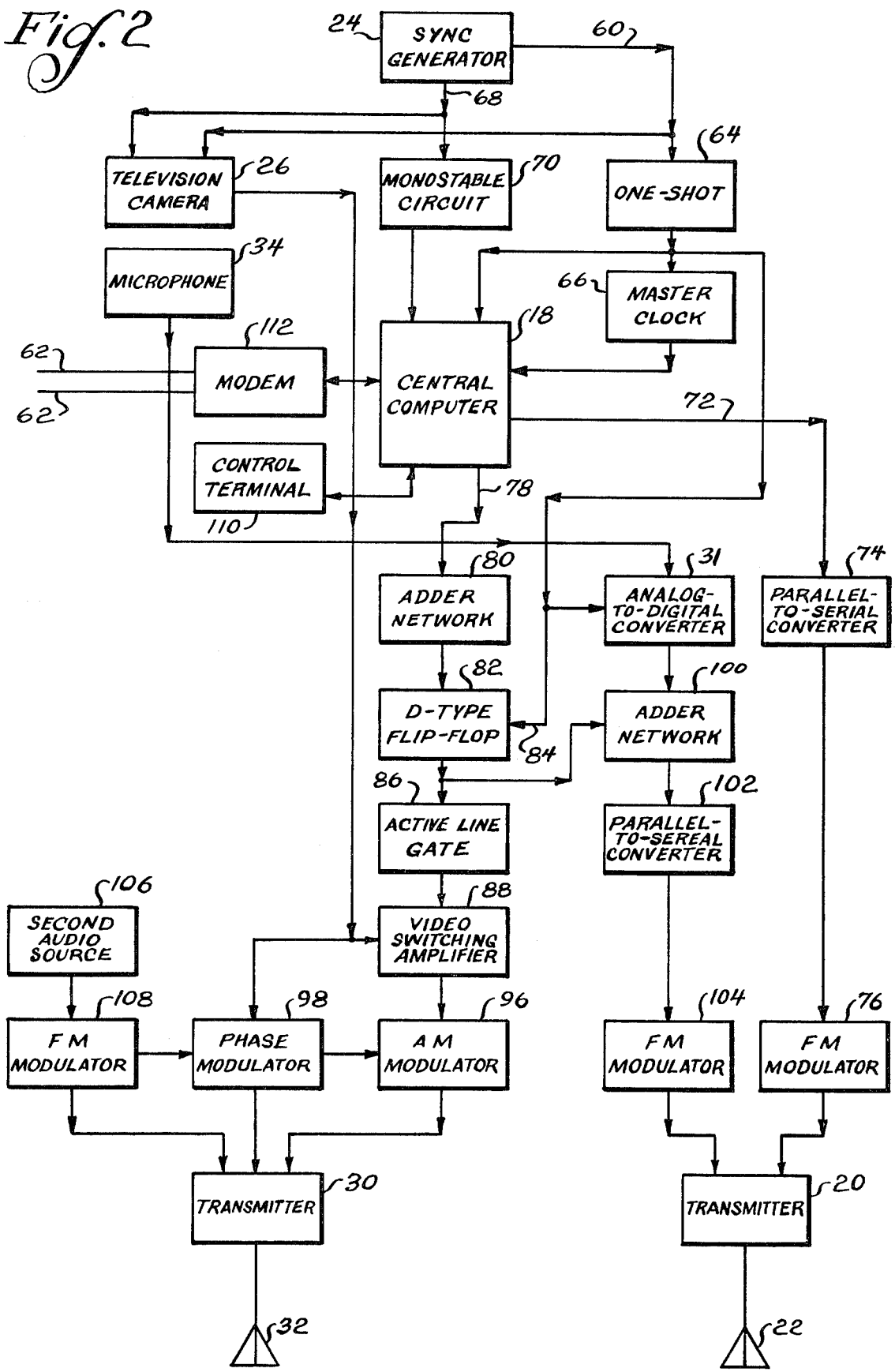
FIG. 2 is a block diagram of a television transmitter at the broadcaster site illustrating the means for encoding or scrambling the standard television signals, embodying the present invention.
Figure 18:
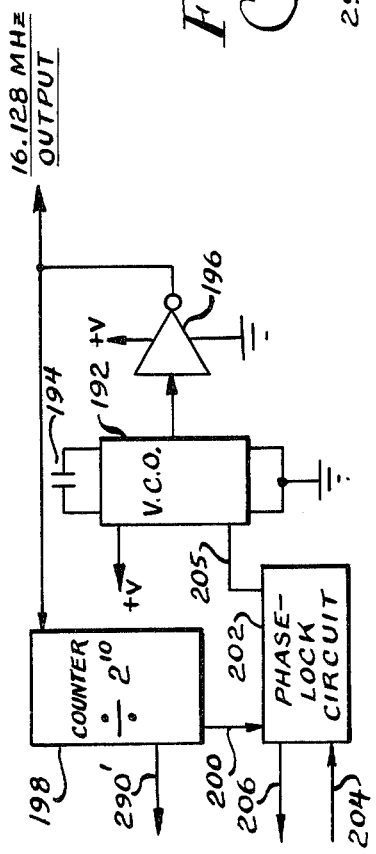
FIG. 18 is a schematic block diagram illustrating circuitry which may be employed as the master clocks 66 and 130 shown in FIGS. 2 and 3.

The synchronization of the entire system is controlled by the master clock 66 of FIG. 2, which is shown in more detail on FIG. 18. The master clock 66 consists of a voltage-controlled oscillator 192 having a capacitor 194 and an input voltage +V. The output of the voltage-controlled oscillator is fed into an inverter 196 whose output is set at a frequency of 16.128 MHz. The output of the inverter 196 is fed to all places requiring this frequency output and to a counter 198 ($\div$ by 1024). The frequency at the output of the counter 198 designated by the lead line 200 is 15,750 Hz which is delivered to one input of a phase-lock circuit 202. The other input of the phase-lock circuit 202 designated by lead line 204 is the horizontal sync pulse from the generator 24 (FIG. 2). Thus, the voltage output of the phase-lock circuit 202 on lead line 206 varies via lead line 205 until voltage-controlled oscillator 192 is phase-locked to the horizontal scanning rate.

Figure 3:
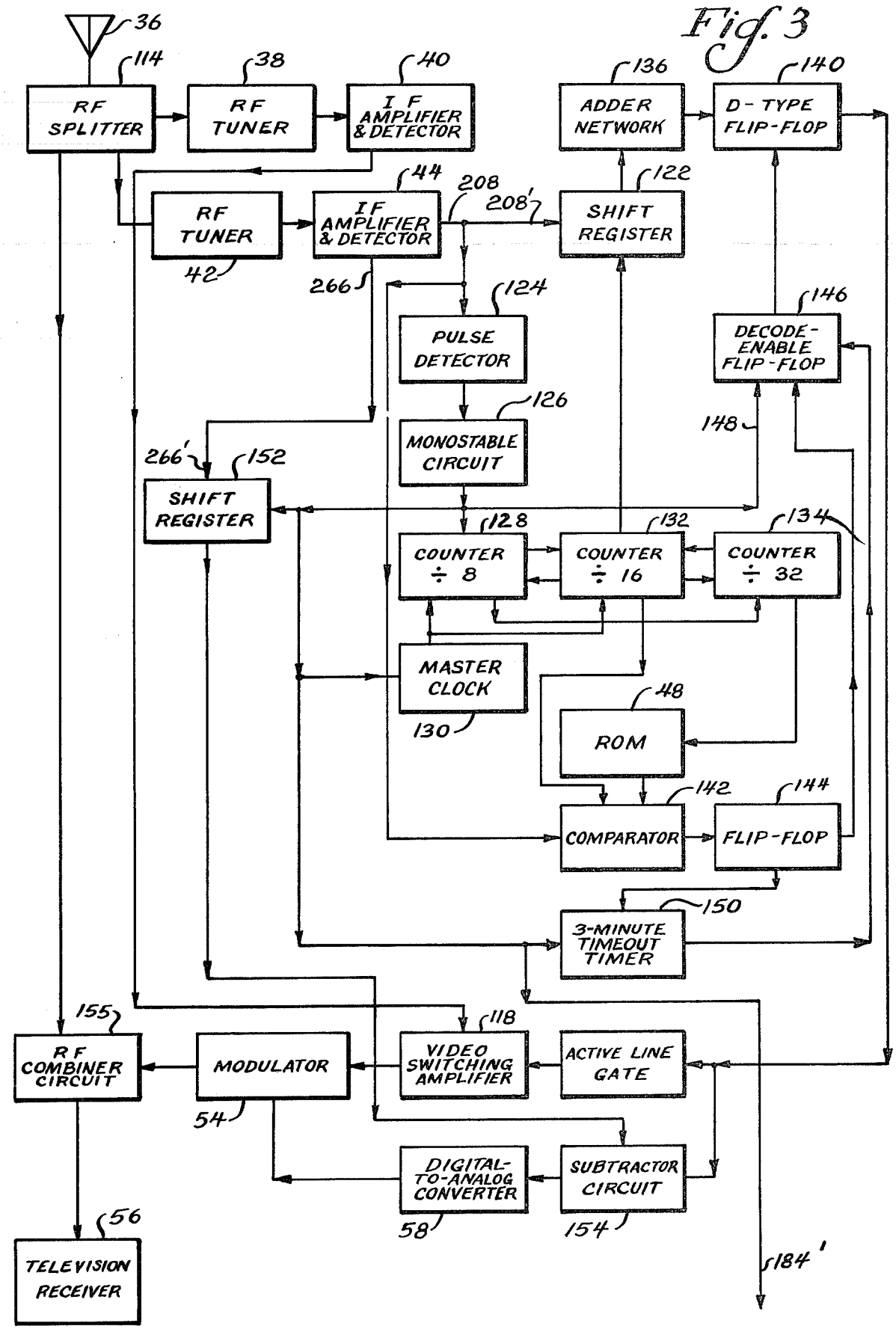
FIG. 3 is a block diagram of a receiver at the subscriber site for decoding or unscrambling the encoded television signals received from the transmitter shown in FIG. 2, according to the present invention.

Referring now to FIG. 9 of the drawings, there is shown in more detail the circuitry of the shift register 122 of FIG. 3. The output containing the control signals from the detector 44 on lead line 208 (FIG. 3) is connected to the lead line 208'. The shift register is composed of a plurality of J-K flip-flops 210 connected serially and a plurality of inverters 212. The output of the flip-flops 210 labeled $2^0$–$2^{31}$ are connected to the corresponding inputs of the full adders 138 on FIG. 5. In order to shift the full 32-bits of the control pulse trains into the flip-flops 210, the transfer pulse is delivered on the lead line 214 which is connected to the lead line 214' in FIG. 10. The control signals on the line 208' are also sent via line 216 which is connected to the lead line 216' on FIG. 10 for reception by the pulse detector 124. The output of the pulse detector on its lead line 218 is utilized to reset the counters 128, 132 and 134. These counters are formed by ten J-K flip-flops 220. The clock input to the counter 128 is on lead line 222 which is connected to the 16.128 MHz output of FIG. 18.

As will be recalled, the clock frequency is actually 16 times greater than the pulse rate of the incoming control signals. Therefore, after eight clock pulses are counted the middle of the first bit of the 32-bit incoming pulse train will be at the input of the flip-flop 210 designated by lead line 224. However, in practice it has been encountered that only four clock pulses need to be counted so as to be in the middle of the first bit. The reason is because of propagation delays and other inherent delays associated with electronic circuitry. Thus, a NAND gate 226 is interconnected so as to generate a transfer pulse on its lead line 214' after the fourth clock pulse and each sixteen pulses thereafter. In this manner, the entire 32-bits of the serial control pulse train is transferred into the flip-flops 210 of FIG. 9.

Prior to the transfer of each bit, a comparision of such bit is being made with one corresponding bit of the unique 32-bit code stored in the read-only-memory 48 by the comparator 142. The output of the comparator is coupled to the flip-flop 144 whose output is connected to an input of NAND gate 228. When there is a comparison, the output of NAND gate 228 on its lead line 230 gates the decode-and-enable flip-flop 146, which is shown in more detail on FIG. 13.

The last J-K flip-flop 232 and the NAND gates 234 in the counter 134 are used to reset all of the counters 128, 132 and 134 after the last pulse or thirty-secondth pulse of the 32-bit control pulse train. Then, the counters are ready to sample and compare the next control pulse train.

In FIG. 11(a), there is shown in more detail the circuitry of the blocks 120, 118 and 140 in FIG. 3 of the drawings. The NAND gate 236 has its one input designated by lead line 238 connected to the output of the decode-and-enable flip-flop 146 designated by lead line 238' (FIG. 13). The other input to the NAND gate 236 designated by lead line 240 is coupled to the clock rate of 15,750 Hz. The output of the NAND gate 236 is connected to one input of the active-line gate 120 and to the clock input of the D-type flip-flops 242. The other inputs designated by lead lines 244 through 250 are connected to the output of the adder network 136 shown in FIG. 5 and designated by $2^0$ through $2^3$. The output of the D-type flip-flop 140 is connected to the subcontractor circuit 154. The other input to the subtractor circuit is the digitized aural signals from the output of the shift register 152 on the lead lines 252. The output of the subtractor circuit 154 is coupled to the input of the digital-to-analog converter 58 whose output on lead line 254 is connected to one input of the modulator 54.

The other input to the active-line gate 120 on its lead line 256 is from the 16.128 MHz output of the master clock on FIG. 18. The active line gate includes ten J-K flip-flops 258 which are connected in a serial manner. As previously discussed, the active-line gate 120 will keep the video switching amplifier 118 in the non-inverting condition, except during the active portion of the horizontal scanning line. The output of the active line gate from NAND gate 260 is connected to amplifier 117 of the video switching amplifier 118. The other input to the amplifier 118 on its lead line 262 is from the output of the IF amplifier and detector 40 containing the scrambled video signals. The output of the amplifier 118 designated by lead line 264 is connected to the other input of the modulator 54.

In FIG. 12, there is shown in more detail the circuitry of the shift register 152 of FIG. 3. The output containing the digitized aural signals from the detector 44 on lead line 266 (FIG. 3) is connected to the lead line 266'. The shift register is composed of a plurality of J-K flip-flops 268 connected serially. The output of the flip-flops 268 labeled $2^0$–$2^{10}$ are connected to the inputs of the subtractor circuit 154 on the lead lines 252 (FIG. 11). In order to shift the full 11-bits of the digitized aural signals into the flip-flops 268, the transfer pulse is delivered on the lead line 270 connected to the output of NAND gate 272. The shift register includes counters 274, 276, and 278. The counter 274 is a divide-by-eight ($\div$ by 8) counter having its clock input coupled to the aural clock rate output in FIG. 13 via lead line 280. In actual practice, it can be seen that the NAND gate 272 is interconnected so as to generate a transfer pulse after the fourth clock pulse and each sixteen pulses thereafter. This is because only four clock pulses are needed to be counted due to propogation delays in electronic circuitry before the middle of the first bit of the 11-bit digitized aural signals is at the input of the flip-flop 268 designated by lead line 282. In this manner, the entire 11-bits of the aural signal is transferred into the flip-flops 268.

All of the counters 274, 276 and 278 are formed from a plurality of J-K flip-flops 284. The counter 276 is connected to the counter 274 so as to form a divide-by-sixteen ($\div$ by 16) counter. The counter 278 is interconnected with the NAND gate 286 so as to form a divide-by-11 counter so that all of the counters are reset by the NAND gate 286 after the last pulse or 11th-bit of the digitized aural signal has been conducted.

FIG. 13, there is shown a divide-by-N counter 288 having the various clock rate outputs. The input to the counter 288 designated by lead line 290 is from the output of the counter 198 on its lead line 290' in FIG. 18. The three-minute output from the counter 288 is used to reset the decode-and-able flip-flop 146 after three minutes of time has elapsed to stop further decoding by the D-type flip-flop 140 unless there is a comparison between one of the control signals with the unique address of the read-only-memory 48 prior to that time. The 30-second output from the counter 288 is connected to the lead line 184 tied to the input of the time-out timer 182 in FIG. 4. The output labeled "clock-rate $2^{17}$" is connected to the lead line 294 in FIG. 14, and the output labeled "clock-rate $2^{13}$" is connected to the lead line 296 in FIG. 14.

Figure 4:
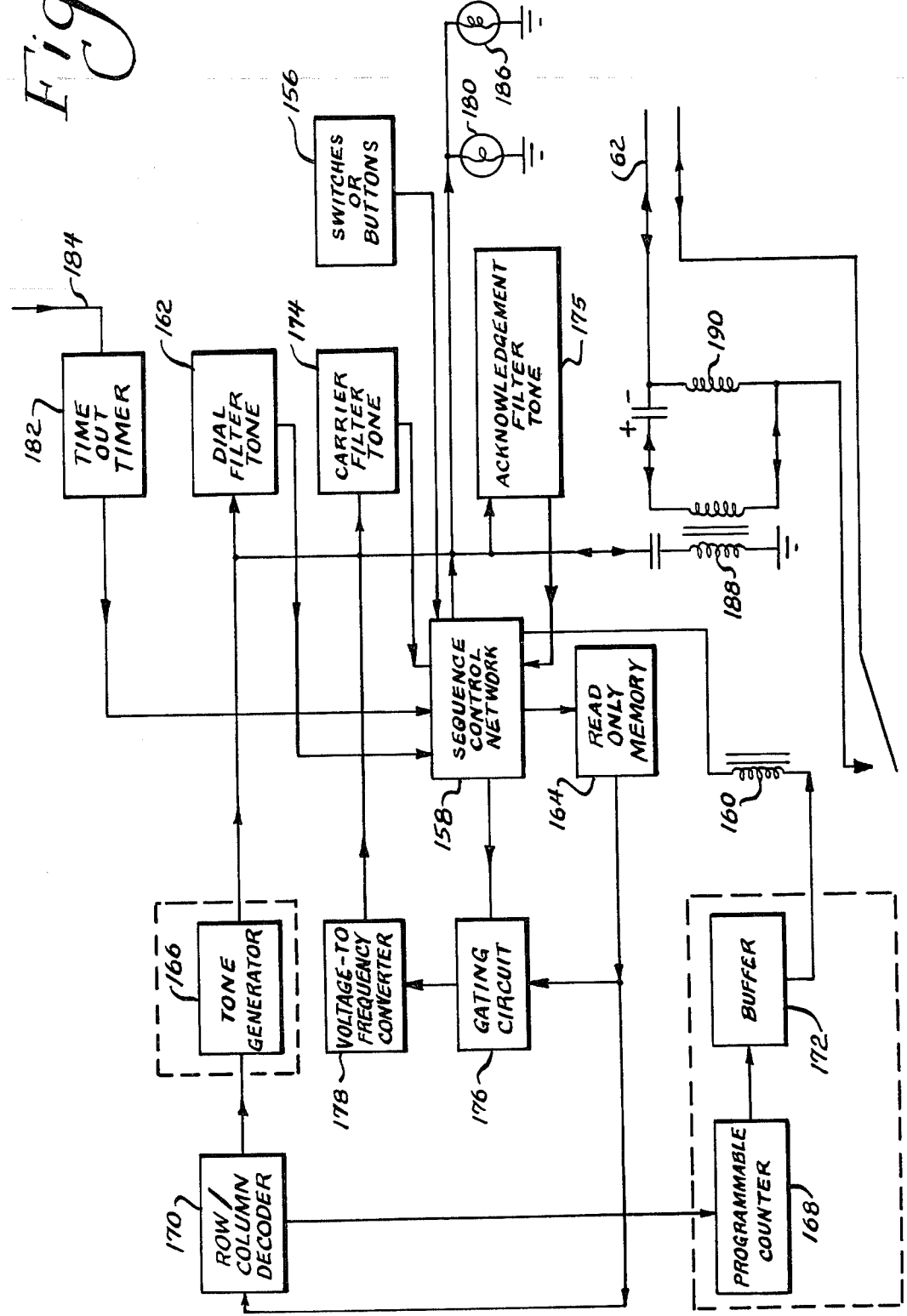
FIG. 4 is a block diagram of telephone communication circuitry for interconnection between the transmitter and receiver, employing the novel methods of the present invention.
Figure 15:
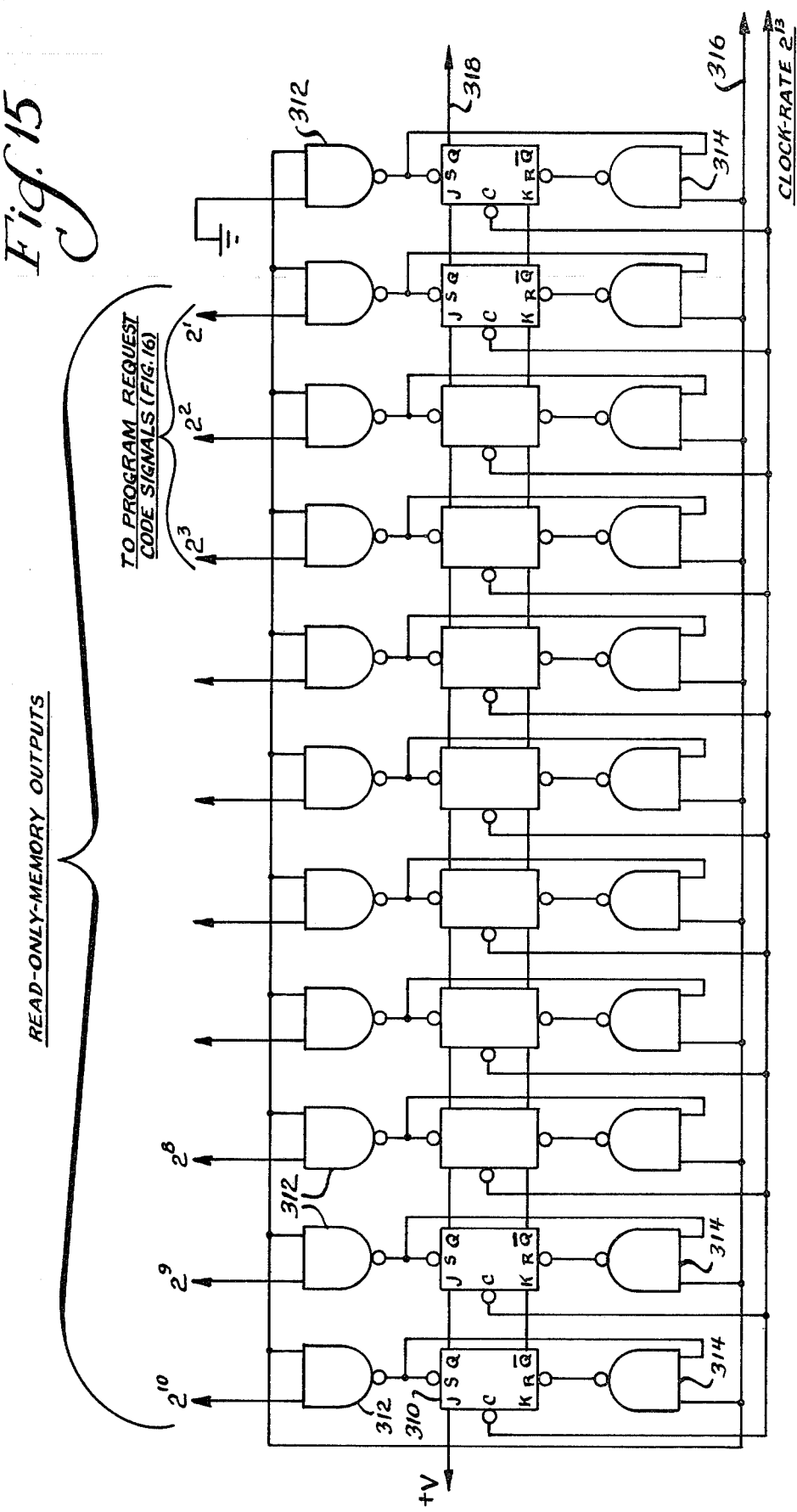
FIG. 15 is a schematic diagram illustrating suitable circuitry for use as the gating circuit 176 of FIG. 4.
Figure 16:
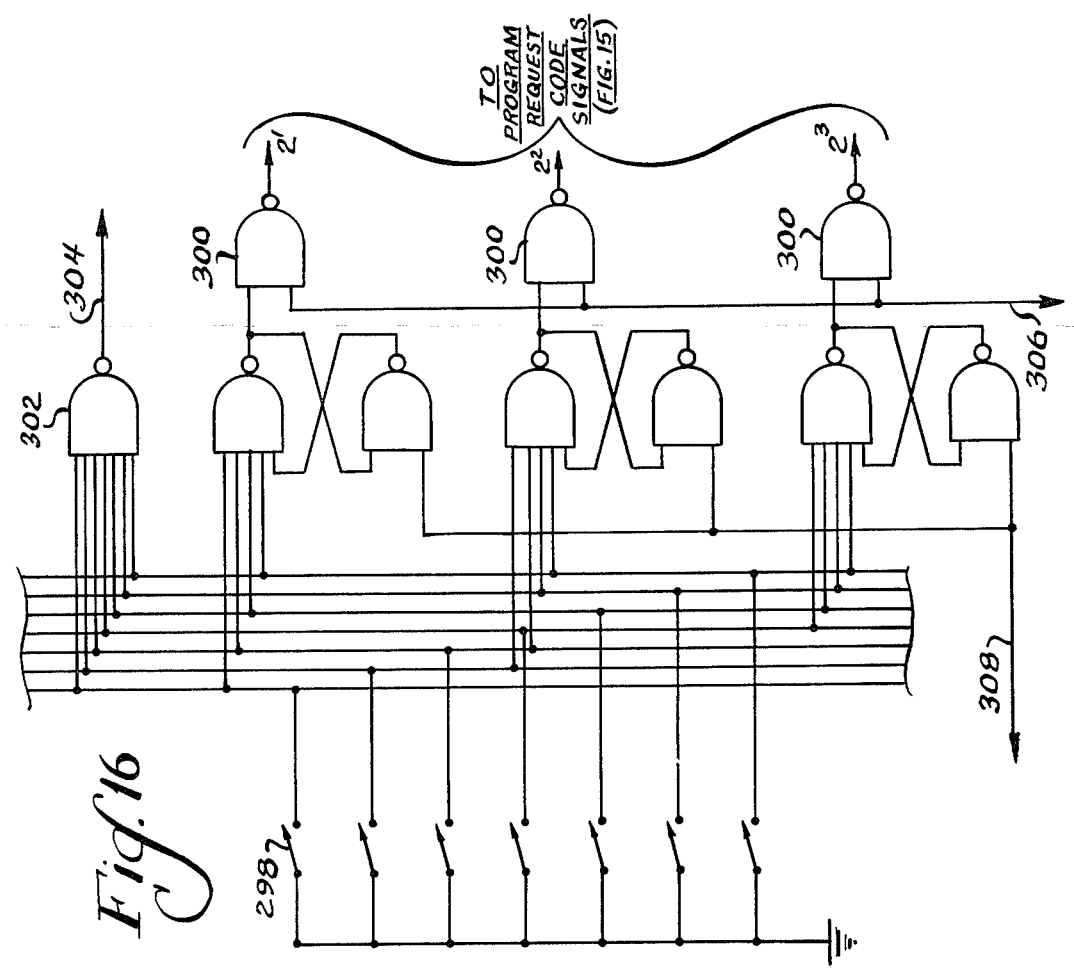
FIG. 16 is a schematic diagram showing circuitry suitable for use as the switches 156 of FIG. 4.

In FIGS. 14–17, there is shown in more detail suitable circuitry which may be used for the telephone communication circuitry shown in FIG. 4 of the drawings. In FIG. 16, there is shown seven buttons or switches 298 for generating the program request code signals at the outputs of the NAND gates 300. The output of the NAND gate 302 designated by lead line 304 is connected to the lead 304' on FIG. 14 to initiate the telephone dial up sequence. The lead line 306 is used to control the telephone request code which is connected to lead line 306' on FIG. 14, and the lead line 308 is used to reset the telephone request code which is connected to lead line 308' also on FIG. 14.

In FIG. 15, there is shown in details of the gating circuit 176 composed of a plurality of J-K flip-flops 310 and NAND gates 312 and 314. The input to the NAND gates 312 are from the read-only-memory 48 and the program request code signals from the NAND gate 300. The transfer of data into the gating circuit is controlled by the lead line 316 which is connected to the lead line 316' on FIG. 14. The output of the gating circuit is designated by lead line 318 which is connected to the input of the voltage-to-frequency converter 178.

In FIG. 14, there is shown the details of the sequence control network 158 and the programmable counter 168. The sequence control network includes J-K flip-flops 324. Each of the outputs of the flip-flops is connected to the read-only-memory 48 and the NAND gate 322 of the counter 168.

Figure 17:
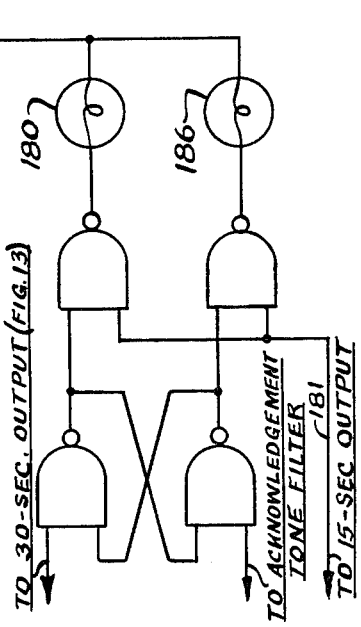
FIG. 17 is a schematic diagram illustrating circuitry which may be employed to control the lights 180 and 186 of FIG. 4.

In FIG. 17, there is shown a typical light driver circuit for lighting the light 180 to indicate a fault and to light the light 186 to indicate receipt of the acknowledgement tone. Illumination of either light 180 or 186 is for fifteen seconds as controlled by lead line 181 (15 sec. output) which is connected to lead line 181' on FIG. 13. While there has only been one such circuit shown, it should be understood that seven are used in this example to correspond to the number of switches 298.

It will be understood from the foregoing description that the present invention significantly advances the state of the art of coding and decoding of standard television signals which allows the reception thereof in an intelligible manner only by authorized subscribers. In particular, the scrambling of the video signals in the invention is effected by inversion of the video signals of some horizontal scan lines on a pseudo-random basis to produce a picture having some video signals inverted and others not inverted. The scrambling of the audio signals is effected by conversion of analog audio signals to coded digital audio signals. Telephone communications circuitry can also be provided so that the subscribers can request their programs to the broadcaster via a telephone interface.

While there has been illustrated and described what is at present to be a preferred embodiment of the present invention, it will be understood by those skilled in the art that various changes and modifications may be made, and equivalence may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out this invention, but that the invention will include all embodiments falling within the scope of the appended claims.

What is claimed is:

1. A subscription television system for scrambling and unscrambling of standard television signals having horizontal scan lines that include horizontal synchronizing signals, vertical synchronizing signals, and video signals, and accompanying audio signals to enable reception of the video and audio signals in an intelligible manner only by authorized subscribers, said system comprising:

(1) transmitting means comprising:

(a) means for scrambling video signals by inversion of the video portion of some horizontal scan lines in a line-by-line fashion on a pseudo-random basis to produce a picture having some video signals inverted and others not inverted which produces a substantially unintelligible visual display;

(b) means for scrambling audio signals;

(c) means for generating a plurality of discrete pulse coded control signals serving to identify individual subscribers which are authorized to unscramble the scrambled video and audio signals and to provide decoding pulses;

(d) means for transmitting the scrambled video and audio signals together with the control signals, said control signals being transmitted separately and simultaneously during transmission of each of the horizontal scan lines on a separate preselected frequency distinct from the video signals to determine whether or not the video portions of the next successive horizontal scan lines is are to be inverted; and (2) receiving means comprising:

(a) means for receiving the transmitted scrambled video and audio signals together with the control signals;

(b) means for storing a unique subscriber identity code;

(c) means for comparing each of the discrete pulse coded control signals with the stored identity code (d) unscrambling means converting said control signals into decoding pulse and responsive to said comparing means when there is a code match for unscrambling of the video and audio signals by means of said decoding pulse in the same sequence as used for scrambling to provide restored video and audio signals without degradation in picture and sound qualities; and (3) controlling means responsive to said plurality of control signals for continuously enabling each of the individual unscrambling means at a particular subscriber's receiving means on a selective basis so that if the comparing means fails to produce a code match for an individual subscriber identity code before a pre-selected time interval has elapsed the unscrambling means is automatically disabled.

2. A subscription television system as claimed in claim 1, wherein said control signals are 32-bit binary pulse trains which are utilized to identify the individual subscribers and to provide different code combinations sufficient to designate up to $2^{30}$ (1,073,741,824) different individual subscribers.

3. A subscription television system as claimed in claim 2, wherein said video scrambling means includes coding means for converting the 32-bit binary pulse trains into a plurality of 4-bit binary scrambler pattern codes.

4. A subscription television system as claimed in claim 3, wherein said coding means includes a plurality of full adder circuits having input bit location which are interchangeable on a pre-selected pattern to render high security to the 4-bit codes.

5. A subscription television system as claimed in claim 4, further comprising amplifier means responsive to one bit in each of the 4-bit codes to increase further the security for generating either an inverted or non-inverted video signal.

6. A subscription television system as claimed in claim 5, wherein said audio scrambling means includes an analog-to-digital converter to convert the analog audio signals to digitized audio signals consisting of 11-bit binary pulse trains to provide added security.

7. A subscription television system as claimed in claim 6, further comprising an additional full adder circuit which combines each of the 11-bit pulse trains with each of the 4-bit codes to generate the coded digital audio signals thereby giving increased security from unauthorized use.

8. A subscription television system as claimed in claim 7, wherein said storing means includes a read-only-memory circuit to store the unique address code consisting of a 32-bit code.

9. A subscription television system as claimed in claim 8, wherein said comparing means includes a comparator circuit to determine if any of the control signals is identical to the 32-bit code stored in the read-only-memory.

10. A subscription television system as claimed in claim 9, wherein said unscrambling means include decoding means for converting the control signals of 32-bit pulse trains into a plurality of 4-bit codes identical to the 4-bit binary scrambled pattern codes used to scramble the video and audio signals so as to decode the transmitted video and audio signals.

11. A subscription television system as claimed in claim 1, further comprising controlling means for continuously enabling the unscrambling means at a particular subscriber's receiving means on a selective basis whereby if there is no comparison by the comparing means before a preselected time interval has elapsed the unscrambling means is disabled.

12. A subscription television system as claimed in claim 1, further comprising telephone communication means interconnected between the transmitting means and the receiving means for requesting to the transmitting means programs desired to be received at the receiving means.

13. A subscription television system as claimed in claim 1, further comprising means for transmitting aural barker signals simultaneously with the scrambled video signals and means for receiving the barker signals regardless of whether the subscriber is authorized to receive the unscrambled video signals so as to promote usage of the subscription television system.

14. A subscription television system as claimed in claim 10, further comprising controlling means for continuously enabling the decoding means at a particular subscriber's receiving means on a selective basis whereby if there is no comparison between the control signals and the address code stored in the read-only-memory before a preselected time interval has elapsed the decoding means is disabled.

15. For use in a subscription television system, a method for scrambling and unscrambling of standard television signals having horizontal scan lines that include horizontal synchronizing signals, vertical synchronizing signals, and video signals, and accompanying audio signals to enable reception of the video and audio signals in an intelligible manner only by authorized subscribers, said method comprising the steps of:

scrambling video signals by inversion of the video signals of some horizontal scan lines on a line-by line fashion in a pseudo-random basis to produce a picture having some video signals inverted and others not inverted which is unpleasant to view and virtually unintelligible;

scrambling audio signals by conversion of analog audio signals to coded digital audio signals;

generating a plurality of unique pulse coded control signals serving to identify individual subscribers which are authorized to unscramble the scrambled video and audio signals;

transmitting the scrambled video and audio signals together with the control signals, said control signals being transmitted separately and simultaneously during each of the horizontal scan lines to determine whether or not the video portion of the next successive horizontal scan line is to be inverted;

receiving the transmitted scrambled video and audio signals together with the control signals;

storing a unique address code to identify a particular subscriber;

comparing each of the pulse coded control signals with the stored address code;

unscrambling of the video and audio signals by means of decoding pulses converted from said control signals in the same sequence as used for scrambling when the step of comparing indicates a match to provide restored video and audio signals without degradation in picture and sound qualities; and enabling continuously the unscrambling step at each individual subscriber's unit on a selective basis so that if there is no match by the comparing step before a pre-selected time interval has elapsed the step of unscrambling is automatically disabled.

16. A method for scrambling and unscrambling of standard television signals as claimed in claim 15, wherein said control signals are 32-bit binary pulse trains which are utilized to identify the individual subscribers and to provide different code combinations sufficient to designate up to $2^{30}$ (1,073,741,824) different individual subscribers.

17. A method for scrambling and unscrambling of standard television signals as claimed in claim 16, wherein said video scrambling step includes the step of coding by converting the 32-bit binary pulse trains into a plurality of 4-bit binary scrambler pattern codes.

18. A method for scrambling and unscrambling of standard television signals as claimed in claim 17, wherein said coding step includes the step of interchanging the input bit locations of a plurality of full adder circuits on a pre-selected pattern to render high security to the 4-bit codes.

19. A method for scrambling and unscrambling of standard television signals as claimed in claim 19, further comprising the step of providing an amplifier responsive to one bit in each of the 4-bit codes to increase further the security for generating either an inverted or non-inverted video signal.

20. A method for scrambling and unscrambling of standard television signals as claimed in claim 19, wherein said audio scrambling step includes the step of providing an analog-to-digital converter to convert the analog audio signals to digitized audio signals consisting of 11-bit binary pulse trains to provide added security.

21. A method for scrambling and unscrambling of standard televison signals as claimed in claim 20, further comprising the step of combining each of the 11-bit pulse trains with each of the 4-bit codes to generate the coded digital audio signals thereby giving increased security from unauthorized use.

22. A method for scrambling and unscrambling of standard television signals as claimed in claim 21, wherein said storing step includes the step of providing a read-only-memory circuit to store the unique address code consisting of a 32-bit code.

23. A method for scrambling and unscrambling of standard television signals as claimed in claim 22, wherein said comparing step includes the step of providing a comparator circuit to determine if any of the control signals is identical to the 32-bit code stored in the read-only-memory.

24. A method for scrambling and unscrambling of standard television signals as claimed in claim 23, wherein said unscrambling step further comprises the step of decoding by converting the control signals of 32-bit pulse trains into a plurality of 4-bit codes identical to the 4-bit binary scrambled pattern codes used to scramble the video and audio signals so as to decode the transmitted video and audio signals.

25. A method for scrambling and unscrambling of standard television signals as claimed in claim 15, further comprising the steps of controlling and enabling continuously the unscrambling step on a selective basis so that if there is no match by the comparing step before a pre-selected time interval has elapsed the step of unscrambling is disabled.

26. A method for scrambling and unscrambling of standard television signals as claimed in claim 15, further comprising the step of requesting by telephone communication programs desired to be received.

27. A method for scrambling and unscrambling of standard television signals as claimed in claim 15, further comprising the steps of transmitting aural barker signals simultaneously with the scrambled video signals and receiving the barker signals regardless of whether the subscriber is authorized to receive the unscrambled video signals so as to promote usage of the subscription television system.

28. A method for scrambling and unscrambling of standard television signals as claimed in claim 24, further comprising the steps of controlling and enabling continuously the decoding step on a selective basis so that if there is no match between the control signals and the address code stored in the read-only-memory before a pre-selected time interval has elapsed the step of decoding is disabled.

29. For use with receivers in a subscription television system, a method for unscrambling of standard television signals scrambled by inversion of video signals of some horizontal scan lines on a line-by-line fashion in a pseudo-random basis to enable reception to transmitted scrambled video signals in an intelligible manner only by authorized subscribers, said method comprising the steps of:

receiving the transmitted scrambled video signals together with a plurality of unique pulse coded control signals which are transmitted separately and simultaneously during each of the horizontal scan lines to determine whether or not the video portion of the next successive horizontal scan line is to be inverted, said control signals identifying individual subscribers which are authorized to unscramble the scrambled video signals and providing information needed to unscramble the transmitted scrambled video signals;

storing a unique address code to identify a particular subscriber;

comparing each of the pulse coded control signals with the stored address code;

unscrambling of the video signals by means of decoding pulses converted from said control signals in the same sequence as used for scrambling when the step of comparing indicates a match to provide restored video signals without degradation in picture quality; and enabling continuously the unscrambling step in response to said plurality of control signals on a selective basis so that if there is no match by the comparing step before a pre-selected time interval has elapsed the unscrambling means is automatically disabled.

30. A method for unscrambling of standard television signals as claimed in claim 29, wherein said control signals are 32-bit binary pulse trains which are utilized to identify the individual subscribers and to provide different code combinations sufficient to designate up to $2^{30}$ (1,073,741,824) different individual subscribers.

31. A method for unscrambling of standard television signals as claimed in claim 30, wherein said storing step includes the step of providing a read-only-memory circuit to store the unique address code consisting of a 32-bit code.

32. A method for unscrambling of standard television signals as claimed in claim 31, wherein said comparing step includes the step of providing a comparator circuit to determin if any of the control signals is identical to the 32-bit code stored in the read-only-memory.

33. A method for unscrambling of standard television signals as claimed in claim 32, wherein said scrambling step further comprises the step of decoding by converting the control signals of 32-bit pulse trains into a plurality of 4-bit codes identical to scrambled pattern codes used to unscramble the video signals so as to decode the transmitted video signals.

34. A method for unscrambling of standard television signals as claimed in claim 29, further comprising the step of controlling and enabling continuously the unscrambling step on a selective basis so that if there is no match by the comparing step before a pre-selected time interval has elapsed the unscrambling means is disabled.

35. A method for unscrambling of standard television signals as claimed in claim 29, further comprising the step of requesting by telephone communication programs desired to be received.

36. A method for unscrambling of standard television signals as claimed in claim 29, further comprising means the step of receiving aural barker signals regardless of whether the subscriber is authorized to receive the unscrambled video signals so as to promote usage of the subscription televisions system.

37. A method for unscrambling of standard television signals as claimed in claim 29, further comprising the step of unscrambling audio signals received in the receiving step which included receiving scrambled audio signals consisting of coded digital audio signals.

38. For use with receivers in a subscription television system, an apparatus for unscrambling of standard television signals scrambled by inversion of standard television signals scrambled by inversion of video signals of some horizontal scan lines on a line-by-line fashion in a pseudo-random basis to enable reception of the video signals in an intelligible manner only by authorized subscribers, said apparatus comprising:

means for receiving the transmitted scrambled video signals together with a plurality of unique pulse coded control signals which are transmitted separately and simultaneously during each of the horizontal scan lines to determine whether or not the video portion of the next successive horizontal scan line is to be inverted, said control signals identifying individual subscribers which are authorized to unscramble the scrambled video signals and providing information needed to unscramble the transmitted scrambled video signals;

means for storing a unique address code to identify a particular subscriber;

means for comparing each of the pulse coded control signals with the stored address code;

means responsive to said comparing means when there is a match for unscrambling of the video and audio signals by means of decoding pulses converted from said control signals in the same sequence as used for scrambling to provide restored video signals without degradation in picture quality; and controlling means responsive to said plurality of control signals for continuously enabling each of the individual unscrambling means at a particular subscriber receiving means on a selective basis so that if there is no comparison by the comparing means of an individual subscriber before a pre-selected time interval has elapsed the unscrambling means is automatically disabled.

39. An apparatus for unscrambling of standard television signals as claimed in claim 38, wherein said control signals are 32-bit binary pulse trains which are utilized to identify the individual subscribers and to provide different code combinations sufficient to designate up to $2^{30}$ (1,073,741,824) different individual subscribers.

40. An apparatus for unscrambling of standard television signals as claimed in claim 39, wherein said storing means includes a read-only-memory circuit to store the unique address code consisting of a 32-bit code.

41. An apparatus for unscrambling of standard television signals as claimed in claim 40, wherein said comparing means includes a comparator circuit to determine if any of the control signals is identical to the 32-bit code stored in the read-only-memory.

42. An apparatus for unscrambling of standard television signals as claimed in claim 41, wherein said unscrambling means include decoding means for converting the control signals of 32-bit pulse trains into a plurality of 4-bit codes identical to scrambled pattern codes used to scramble the video signals so as to decode the transmitted video signals.

43. An apparatus for unscrambling of standard television signals as claimed in claim 38, further comprising controlling means for continuously enabling the unscrambling means at a particular subscriber receiving means on a selective basis whereby if there is no comparison by the comparing means before a pre-selected time interval has lapsed the unscrambling means is disabled.

44. An apparatus for unscrambling of standard television signals as claimed in claim 38, further comprising telephone communication means for requesting programs desired to be received.

45. An apparatus for unscrambling of standard television signals as claimed in claim 38, further comprising means for receiving aural barker signals regardless of whether the subscriber is authorized to receive the unscrambled video signals so as to promote usage of the subscription television system.

46. An apparatus for unscrambling of standard television signals as claimed in claim 38, further comprising means for unscrambling audio signals received in the receiving means which included means for receiving scrambled audio signals consisting of coded digital audio signals.

47. A subscription television system as claimed in claim 2, wherein the first bits of the 32-bit binary pulse trains are always in the low state and the last bits thereof are always in the high state so as to facilitate in detection and synchronization by said receiving means.

48. A subscription television system as claimed in claim 39, wherein the first bits of the 32-bit binary pulse trains are always in the low state and the last bits thereof are always in the high state so as to facilitate in detection and synchronization by said receiving means.

49. A subscription television system as claimed in claim 6, wherein the first bits of the 11-bit binary pulse trains are always in the low state and the last bits thereof are always in the high state so as to facilitate in detection and synchronization by said receiving means.

50. A subscription television system as claimed in claim 2, wherein said means for receiving the transmitted scrambled video and audio signals together with the control signals include counter circuitry to sample and detect the contents of the 32-bit binary pulse trains and a shift register to convert the serial inputs of the pulse trains to a parallel output.

51. A subscription television system as claimed in claim 49, wherein said means for receiving the transmitted scrambled video and audio signals together with the control signals further include an additional counter to sample and the content of the 11-bit binary pulse trains and a shift register to convert the series inputs of the pulse trains to a parallel output.

52. A subscription television system as claimed in claim 12, wherein said telephone communication means includes a plurality of buttons to allow a subscriber to place a request to the transmitting means.

53. A subscription television system as claimed in claim 52, wherein said telephone communication means further includes a dial tone detector to determine when telephone lines are clear for transmission of a dial address to the transmitting means.

54. A subscription television system as claimed in claim 53, wherein said telephone communication means further includes a carrier tone detector to determine when the transmitting means is ready to receive the subscriber's account code and request codes.

55. A subscription television system as claimed in claim 53, wherein said telephone communication means further includes a multi-frequency tone generator for dialing the transmitter means.

56. A subscription television system as claimed in claim 53, wherein said telephone communication means further includes a programmable divide-by-N counter to to cause various number of contact closure interruptions to dial the transmitting means.

57. A subscription television system as claimed in claim 55, further including a voltage-to-frequency converter for transmitting the subscriber's account code and request codes.

58. A subscription television system as claimed in claim 54, further including an acknowledgment tone detector to determine the successful completion of transmitting the subscriber's account code and request codes.

59. A subscription television system as claimed in claim 58, further including indicating means to visually display a successful completion of request or a failure of a completion.

60. A subscription television system as claimed in claim 52, wherein said telephone communication means includes a timer circuit to reset the subscriber's if it is not completed within a pre-determined time interval.

61. A subscription television system as claimed in claim 1, wherein said means for unscrambling of the video and audio signals includes modulator means to convert the restored video and audio signals to a desired locally unused VHF channel as the secure channel.

62. A subscription television system as claimed in claim 1, further comprises RF splitter and combiner circuits to permit viewing of all of the other unscrambled television channels unaffected by the scrambling means.

63. A subscription television system as claimed in claim 1, further comprising a phase-locked master clock for synchronizing the control signals to a horizontal scanning rate utilized by the transmitting means.

64. The subscription television system of claim 1 wherein the means for scrambling audio signals includes means for conversion of analog audio signals to coded digital audio signals.

* * * * *